(12) United States Patent
Klausriegler

(10) Patent No.: US 9,238,342 B2
(45) Date of Patent: Jan. 19, 2016

(54) INSTALLATION AND METHOD FOR PRODUCING HOLLOW BODIES BY INFECTION MOULDING AND BLOW MOULDING

(75) Inventor: Heinz Klausriegler, Kremsmuenster (AT)

(73) Assignee: Mould & Matic Solutions GmbH, Micheldorf (AT)

( * ) Notice: Subject to any disclaimer, the term of this patent is extended or adjusted under 35 U.S.C. 154(b) by 268 days.

(21) Appl. No.: 13/978,433

(22) PCT Filed: Jan. 9, 2012

(86) PCT No.: PCT/AT2012/050003
§ 371 (c)(1),
(2), (4) Date: Aug. 14, 2013

(87) PCT Pub. No.: WO2012/092639
PCT Pub. Date: Jul. 12, 2012

(65) Prior Publication Data
US 2013/0328249 A1  Dec. 12, 2013

(30) Foreign Application Priority Data

Jan. 7, 2011  (AT) .................................. A 22/2011

(51) Int. Cl.
| | | |
|---|---|---|
| *B29D 22/00* | (2006.01) | |
| *B29C 49/06* | (2006.01) | |
| *B29C 49/42* | (2006.01) | |
| B29C 49/64 | (2006.01) | |
| B29L 31/00 | (2006.01) | |

(52) U.S. Cl.
CPC ............ *B29D 22/003* (2013.01); *B29C 49/061* (2013.01); *B29C 49/4205* (2013.01); *B29C 49/6463* (2013.01); *B29L 2031/716* (2013.01)

(58) Field of Classification Search
None
See application file for complete search history.

(56) References Cited

U.S. PATENT DOCUMENTS 4,310,282 A * 1/1982 Spurr et al. .................... 425/533
4,525,134 A * 6/1985 McHenry et al. ............. 425/130
2006/0290034 A1 12/2006 Sideris

FOREIGN PATENT DOCUMENTS

| GB | 2 094 755 A1 | 9/1982 |
|---|---|---|
| GB | 2 422 571 A | 8/2006 |
| JP | H08-281782 A | 10/1996 |

(Continued)

OTHER PUBLICATIONS

International Search Report of PCT/AT2012/050003, Aug. 13, 2012.

*Primary Examiner* — Monica Huson
(74) *Attorney, Agent, or Firm* — Collard & Roe, P.C.

(57) ABSTRACT

The invention relates to an installation and a method of producing hollow bodies by injection molding and subsequent blow molding. The installation comprises an injection molding tool with at least one cavity for producing a preform with a neck continuation and a hollow body part adjoining the neck continuation, a blow mold for shaping the hollow body from the preform and transfer means for transporting the preform from the injection molding tool to the blow mold. The transfer means comprises a carrying frame in which at least one holding element for the at least one preform is disposed. When transferring the preform from the opened injection molding tool to the transfer means, the preform is held on the outside of its neck continuation by a tool part of the injection molding tool and is thereby removed from the cavity. The preform is then placed with the inside of its neck continuation into the holding element, such that the holding element bears against an inner surface of the neck continuation.

17 Claims, 13 Drawing Sheets

(56) References Cited

FOREIGN PATENT DOCUMENTS

| JP | 2003-305766 A | 10/2003 |
| JP | 2010-149460 A | 7/2010 |
| WO | WO 02/38353 A2 | 5/2002 |

* cited by examiner

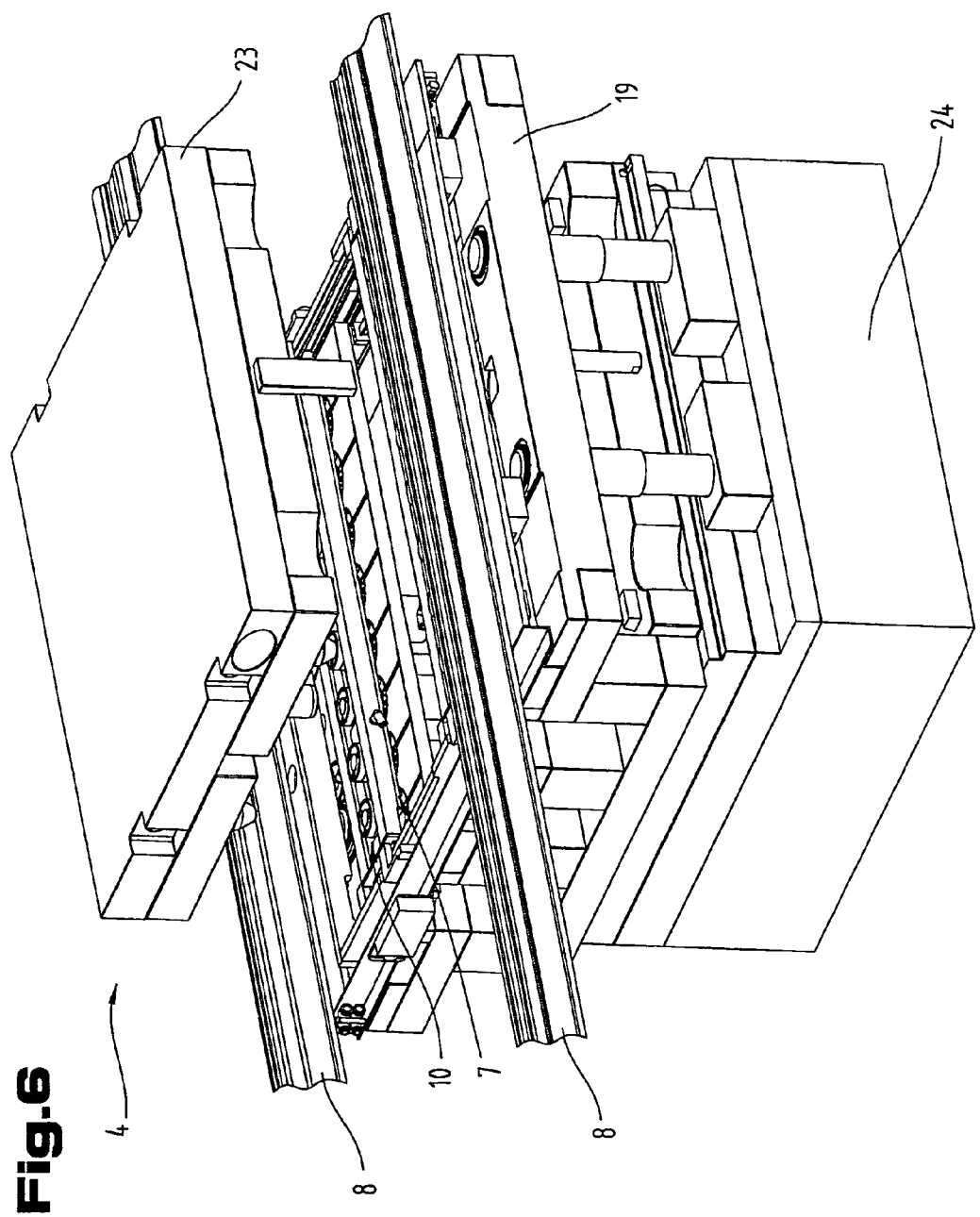

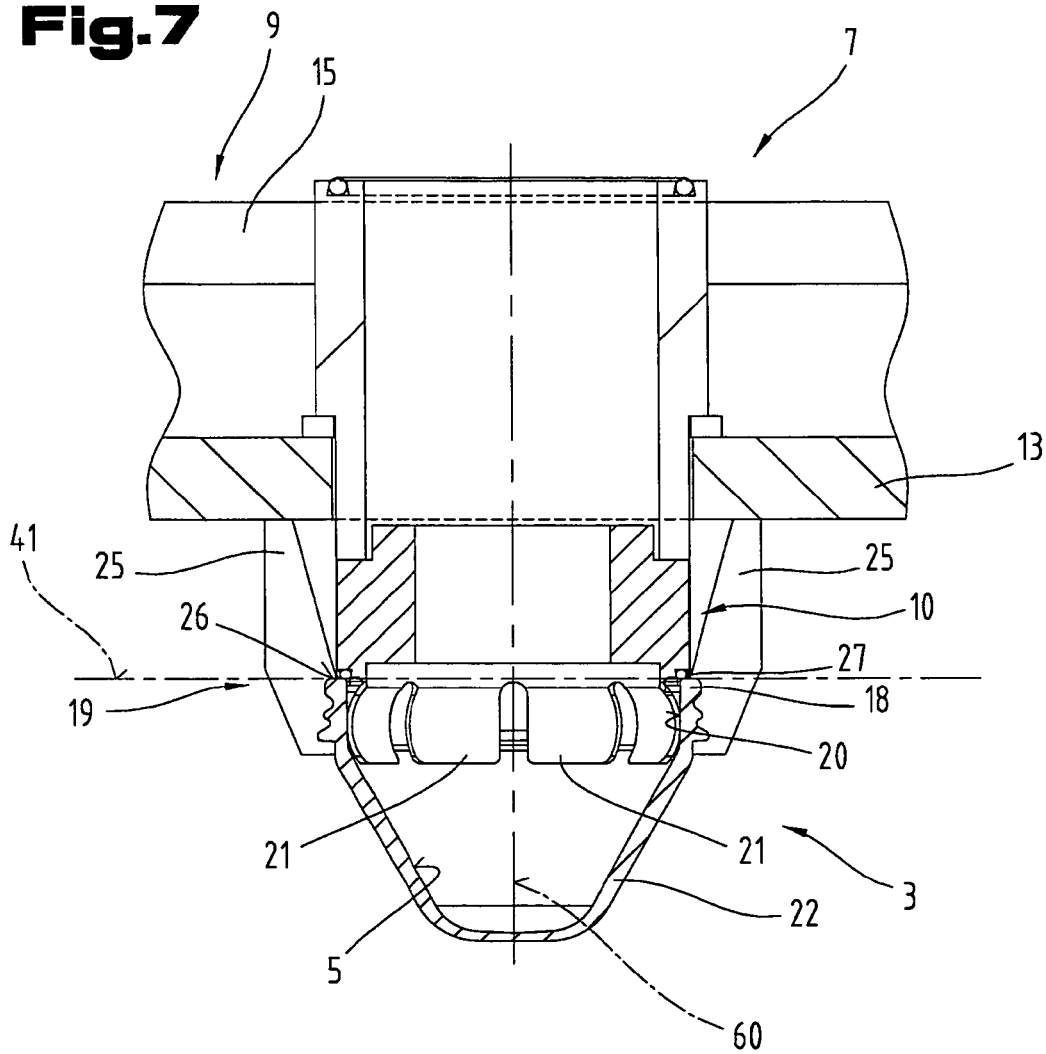
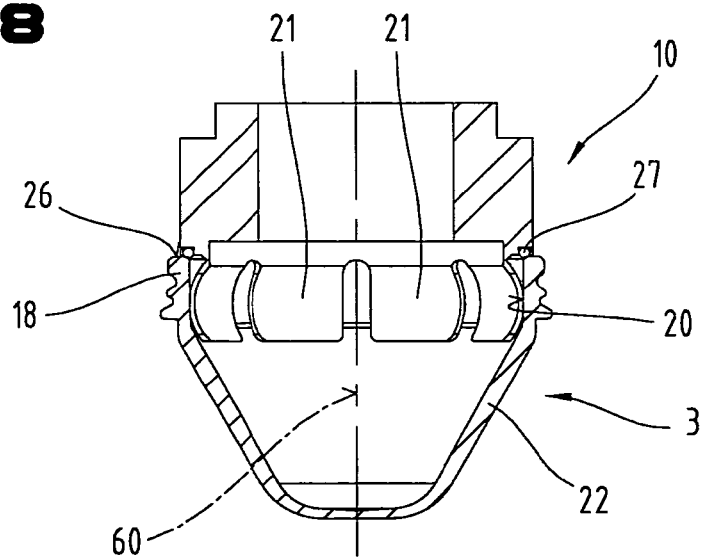

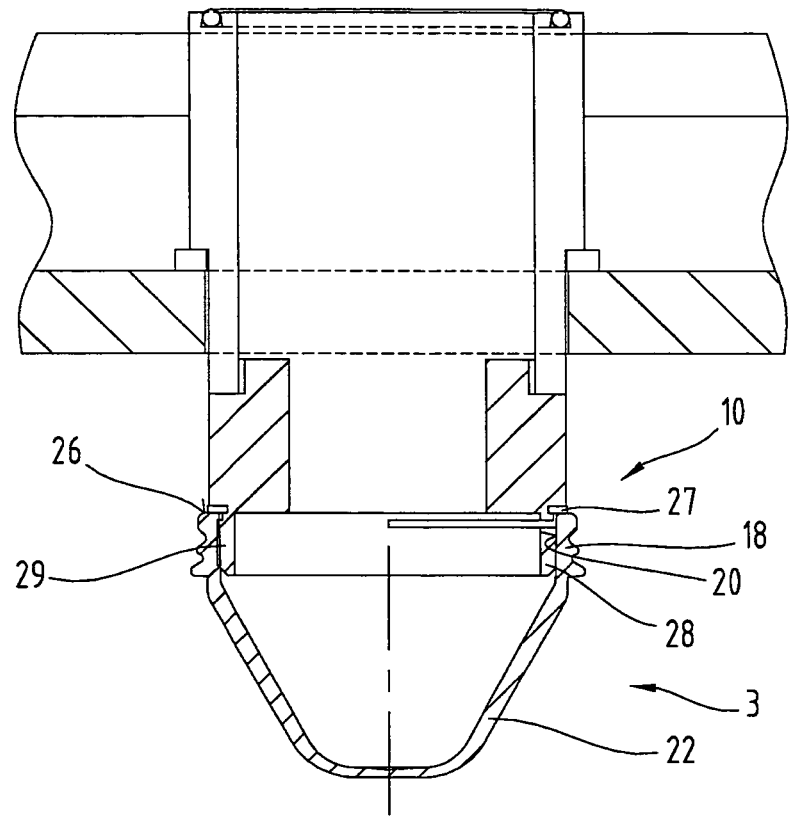
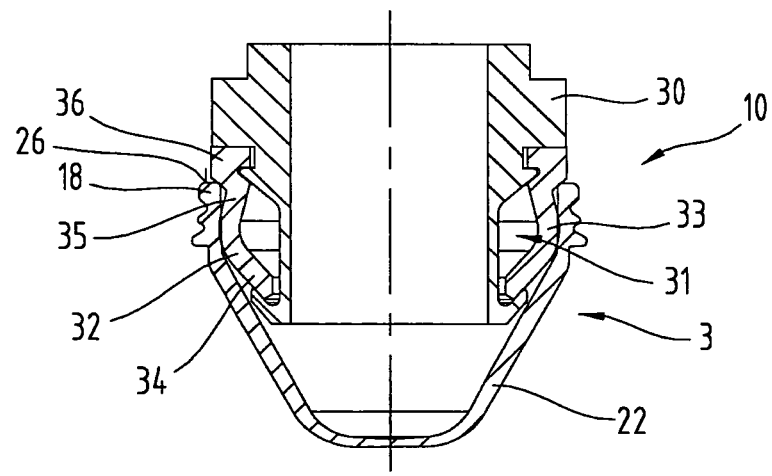

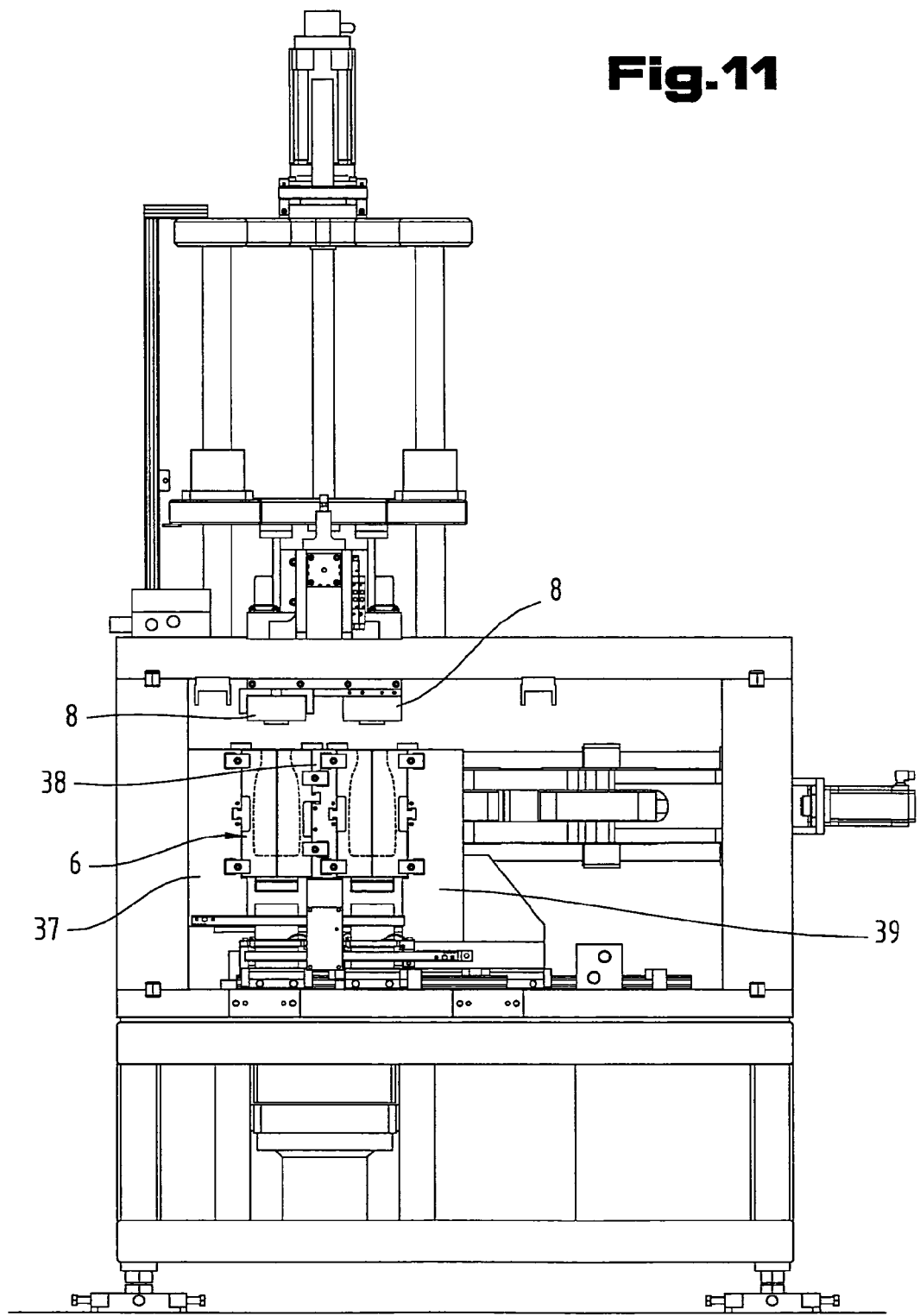

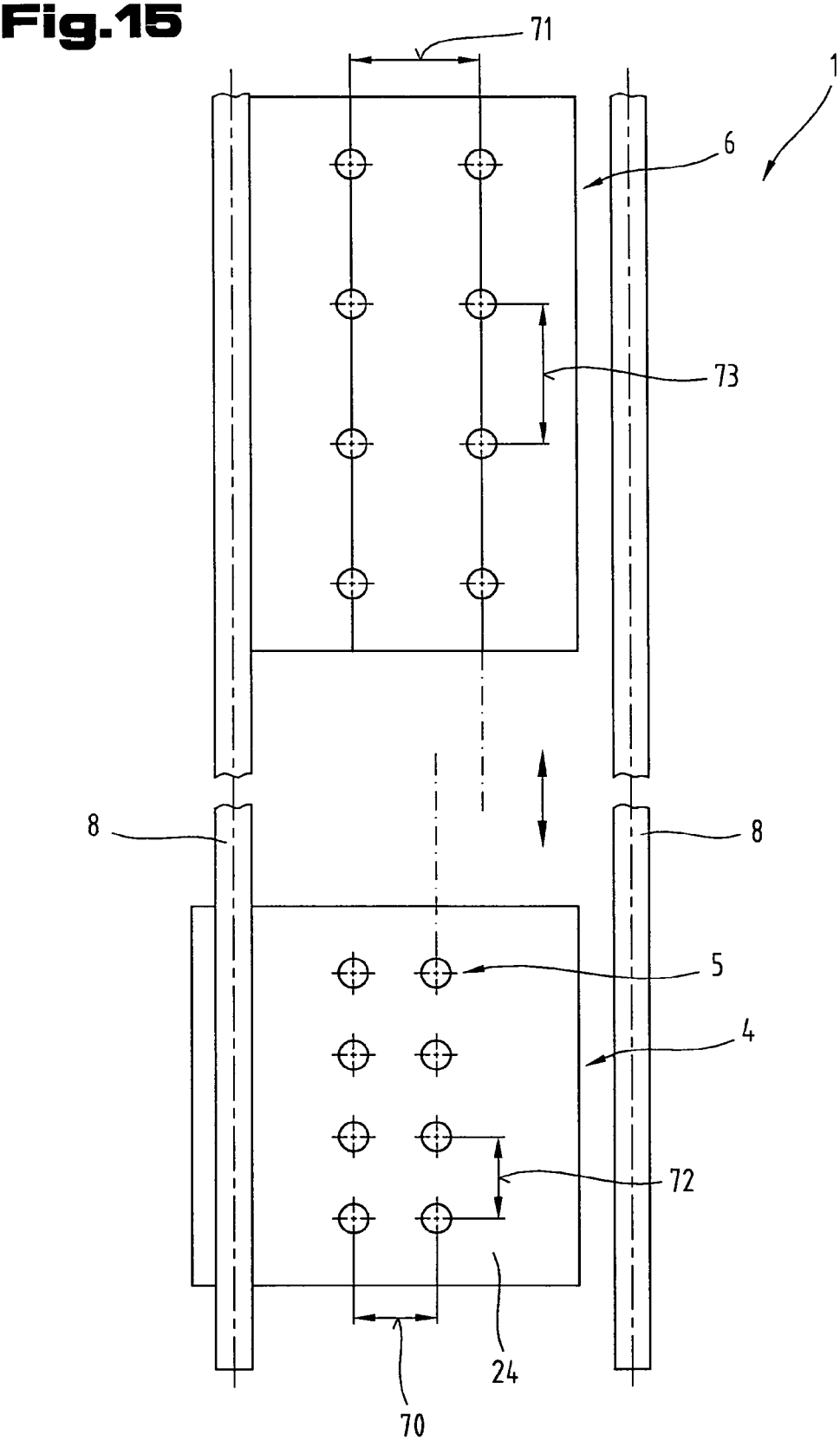

INSTALLATION AND METHOD FOR PRODUCING HOLLOW BODIES BY INFECTION MOULDING AND BLOW MOULDING

CROSS REFERENCE TO RELATED APPLICATIONS

This application is the National Stage of PCT/AT2012/050003 filed on Jan. 9, 2012 which claims priority under 35 U.S.C. §119 of Austrian Application No. A 22/2011 filed on Jan. 7, 2011, the disclosure of which is incorporated by reference. The international application under PCT article 21(2) was not published in English.

The invention relates to an installation for producing hollow bodies by injection molding and subsequent blow molding.

In the blow molding industry, a distinction is made in principle between a single stage and a two stage production process of hollow bodies. In a two stage process, the preforms are produced first of all in an injection molding station and stored, whilst they still require little space. If finished hollow bodies are needed, the preforms are fed in series through heat chambers and heated, optionally to a certain extent differently in different ones. Preheated in this manner, the preforms are fed to the blow mold, where they are then blown at high pressure to produce the final hollow bodies, for example in the form of bottles or cartons or canisters.

In the other known single stage process, the preform is produced first of all in an injection molding tool, the preform is removed from the latter and then transferred via a rotating table to the blowing station for the final molding process. As this happens, it is possible for the resultant preform to be held in the region of its external circumference by the collar or to remain directly on the mold core of the injection molding tool and transported on to the blowing station by means of the latter.

The underlying objective of this invention is to propose an installation for producing hollow bodies by injection molding and subsequent blow molding, in which the final shaping of the hollow body takes place directly following the injection molding process and the entire transport system can be set up within the installation in a simple manner.

This objective of the invention is achieved by an installation for producing hollow bodies by injection molding and subsequent blow molding, comprising an injection molding tool with at least one cavity for producing a preform with a neck continuation and a hollow body part adjoining the neck continuation, a blow mold for shaping the hollow body from the preform and transfer means for transporting the preform from the injection molding tool to the blow mold. The transfer means comprises a carrying frame on which at least one holding element for the at least one preform is disposed and when the preform is being transferred between the opened injection molding tool and the transfer means, the preform is held by the outside of its neck continuation by a tool part of the injection molding tool and is removed from the cavity. The preform is placed onto the holding element by the inside of its neck continuation and the holding element thus lies in contact with an internal face of the neck continuation. With the present invention, the injection molding tool and the blowing station with its blow mold can be operated virtually independently. The fact that it is possible to manage with at least one transfer means, the injection molding tool opened and the preforms removed from it, followed by the associated transfer to the transfer means, then offers the possibility after only a short transport run of closing the injection molding tool again and running a new injection molding process whilst the transfer means together with the preforms is being moved to the blowing station. Since the preforms are held or clamped on the holding elements of the transfer means from the inside during the transfer already, all the external faces in the region of the external face of the preform and the Subsequently produced hollow body are accessible without obstruction. Due to the specially designed holding element, not only can the preform and the body produced from it be held from the inside, the co-operating forming means can also be fed through the holding element in the region of the blowing station for the final shaping. This results in a central, space-saving holding arrangement for the preforms and hollow bodies produced from them later.

Also of advantage is another embodiment in which the holding element has a holder element directed towards the neck continuation, which is displaceable between a release position and a clamping position, because it offers the possibility of ensuring a controlled, individual hold or clamping of the preforms or hollow bodies to be held in the region of the holding element. Not only does this simplify the operation of placing the preform on the holding element, it ensures clamping on the holding element without causing damage. If the clamping body is designed so that it extends around the circumference, a more even pressure distribution can be obtained. Furthermore, it enables better positioning of the preforms to be shaped in the region of the blow mold.

In another embodiment, the holding element has a holder groove in its circumferential region with a circumferentially extending seal element accommodated therein. In addition to and independently of clamping the neck continuation, it is also possible to seal the interior of the preform whilst producing the hollow body starting from the preform. By providing a separate seal element and operating it by means of the blowing air introduced, the sealing contact of the seal element on the internal face of the neck continuation is not established until the start of the shaping process. The seal element is radially widened, thereby establishing the sealing contact.

Also of advantage is a design in which the holding element is provided with a coolant passage which establishes a flow connection to a supply system via a supply and discharge line because immediately following the start of the operation of holding the preform on the holding element already, the region of the preform which has already assumed its final three-dimensional shape as a result of the injection molding process and no longer has to be modified is rapidly removed from the applied heat and continues to solidify. This prevents any undesired change of shape, at least of the neck continuation, whilst the preform is held or clamped on the holding element.

Due to the design of the holding element being displaceably mounted on the carrying frame so as to move transverse to the transport direction, it is possible to keep the conveying movement of the transfer means with its carrying frame on a straight line, including in the region of the blow-ing station, in particular its blow mold, whilst nevertheless enabling the hollow bodies pro-duced in the blow mold to be unmolded without obstruction.

Based on another embodiment in which several holding elements are disposed on a first base plate one after the other in the transport direction and several other holding elements are disposed on another base plate, it is possible to operate a system of multiple production of preforms as well as the hollow bodies made from them, whilst nevertheless maintaining a straight conveying path through the entire installation.

Also of advantage is another embodiment in which the carrying frame is guided by a guide arrangement in a straight transport movement between the injection molding tool and the blow mold, because the transfer means can be exactly guided throughout the entire installation in the simplest manner.

In another embodiment, the tool part is disposed between the mold halves of the injection molding tool, and the tool part constitutes the shaping part of the external face of the neck continuation. The advantage of this embodiment is that already in the region of the injection molding tool where the produced preforms are removed, a separate tool part is provided, which is used not only to shape a part-section of the preform, but also permits the unmolding movement of the preforms from the opened injection molding tool at the same time. It is not until the preforms have been transferred onto the transfer means that the preforms are released from the tool part from the outside. After running the appropriate resetting operations and closing the entire injection molding tool, predefined spaces or cavities are available again for the ongoing injection molding process.

In another embodiment, the blow mold comprises several blow mold parts disposed adjacent to one another as viewed in the transport direction, and the blow mold parts are guided relative to one another in displacement in a vertically oriented dividing plane as viewed relative to the transport direction of the transfer means. As a result, the onward movement of the transfer means can be kept in a straight line due to the selected sideways opening movement of the blow mold parts of the blow mold whilst nevertheless enabling orderly removal of the produced hollow bodies from the mold.

If the neck continuation is held by the holding element during the blowing operation, unnecessary transfer operations are avoided but a totally efficient process of producing hollow bodies from the preforms is still possible. Accordingly, the preform can be placed directly in the blow mold without any complex manipulation and after the final production operation, the resultant hollow bodies can be removed without additional transfer operations and removed and conveyed onwards with the same holding element.

Also of advantage is a design in which after the blowing operation, the hollow body together with the holding element is displaced relative to the carrying frame transverse to the transport direction, because a simple unmolding operation and removal of the produced hollow bodies can also be run in the region of the blowing station without it being necessary to provide a separate guide track for the transfer means.

The objective of the invention is also achieved, independently, by means of a method f producing hollow bodies by injection molding and subsequent blow molding in which a preform with a neck continuation and a hollow body part adjoining the neck continuation is injected in at least one cavity in an injection molding tool, after which the injection molding tool is opened and the preform is removed from it and transported by a transfer means to a blow mold. The hollow body is formed in the blow mold from the preform, wherein the preform is held by the outside face of its neck continuation when the injection molding tool is opened and removed from the cavity, and the preform is placed onto a holding element disposed on a carrying frame of the transfer means by the inside of its neck continuation and the holding element is placed in contact with an internal face of the neck continuation. The advantages gained from the defined combination of features are that the injection molding tool and the blowing station with its blow mold can be operated virtually independently. The fact that it is possible to manage with at least one transfer means, the injection molding tool opened and the preforms removed from it, followed by the associated transfer to the transfer means, then offers the possibility after only a short transport run of closing the injection molding tool again and running a new injection molding process whilst the transfer means together with the preforms is being moved to the blowing station. Since the preforms are held or clamped on the holding elements of the transfer means from the inside during the transfer already, all the external faces in the region of the external face of the preform and the subsequently produced hollow body are accessible without obstruction. Due to the specially designed holding element, not only can the preform and the body produced from it be held from the inside, the co-operating forming means can also be fed through the holding element in the region of the blowing station for the final shaping. This results in a central, space-saving holding arrangement for the preforms and hollow bodies produced from them later.

In one embodiment, a holder element is disposed on the holding element on its external face directed toward the neck continuation and the holding element is displaceable between a release position and a clamping position. This has proved to be of advantage because it offers the possibility of ensuring a controlled, individual hold or clamping of the preforms or hollow bodies to be held in the region of the holding element. Not only does this simplify the operation of placing the preform on the holding element, it ensures clamping on the holding element without causing damage. If the clamping body is designed so that it extends around the circumference, a more even pressure distribution can be obtained. Furthermore, it enables better positioning of the preforms to be shaped in the region of the blow mold.

Based on one advantageous variant of the method in which a cooling passage is provided in the holding element and a coolant circulates through the coolant passage, immediately following the start of the operation of holding the preform on the holding element already, the region of the preform which has already assumed its final three-dimensional shape as a result of the injection molding process and no longer has to be modified is rapidly removed from the applied heat and continues to solidify. This prevents any undesired change of shape, at least of the neck continuation, whilst the preform is held or clamped on the holding element.

Also of advantage is a variant of the method in which the holding element is mounted on the carrying frame so as to be displaceable relative thereto in the direction transverse to the transport direction of the carrying frame between the injection molding tool and the blow mold, because it is possible to keep the conveying movement of the transfer means with its carrying frame on a straight line, including in the region of the blowing station, in particular its blow mold, whilst nevertheless enabling the hollow bodies produced in the blow mold to be unmolded without obstruction.

The approach in which the carrying frame is guided by a guide arrangement in a straight transport movement between the injection molding tool and the blow mold enables the transfer means to be exactly guided throughout the entire installation in the simplest manner.

An embodiment of the method in which the tool part is disposed between mold halves of the injection molding tool and the when the molding tool is closed, the tool part constitutes the shaping part of the external face of the neck continuation, is also of advantage because already in the region of the injection molding tool where the produced preforms are removed, a separate tool part is provided, which is used not only to shape a part-section of the preform, but also permits the unmolding movement of the preforms from the opened injection molding tool at the same time. It is not until the preforms have been transferred onto the transfer means that the preforms are released from the tool part from the outside.

After running the appropriate resetting operations and closing the entire injection molding tool, predefined spaces or cavities are available again for the ongoing injection molding process.

Another variant of the method in which the blow mold is made of several blow mold parts disposed adjacent to one another as viewed in the transport direction and the blow mold parts are guided in displacement relative to one another in a vertically oriented dividing plane as viewed in the transport direction of the transfer means is possible whereby the onward movement of the transfer means can be kept in a straight line due to the selected sideways opening movement of the blow mold parts of the blow mold whilst nevertheless enabling orderly removal of the produced hollow bodies from the mold.

The approach based in which the neck continuation is held b the holding element during the blowing operation from the hollow body is also of advantage because unnecessary transfer operations are avoided but a totally efficient process of producing hollow bodies from the preforms is still possible. Accordingly, the preform can be placed directly in the blow mold without any complex manipulation and after the final production operation, the resultant hollow bodies can be removed without additional transfer operations and removed and conveyed onwards with the same holding element.

The variant of the method in which after the blowing operation and after the mold is opened, the hollow body together with the holding element is displaced relative to the carrying frame transverse to the transport direction is of advantage because a simple unmolding operation and removal of the produced hollow bodies can also be run in the region of the blowing station without it being necessary to provide a separate guide track for the transfer means.

Finally, an approach in which features of the hollow body are detected in an inspection station adjoining the blow mold is of advantage because immediately after the hollow bodies have been produced, a quality inspection is possible already so that attention can be drawn to possible production faults straight away enabling rapid intervention in the production process. This also offers the possibility of separating out hollow bodies that are faulty or do not meet the desired quality.

To provide a clearer understanding, the invention will be described in more detail below with reference to the appended drawings.

These are highly schematic, simplified drawings illustrating the following:

FIG. 6 is a simplified diagram illustrating the injection molding tool illustrated in FIGS. 4 and 5 in the opened position and the transfer means between the mold parts;

FIG. 7 is a simplified diagram showing a view in section of the holding element with the additional tool part of the injection molding tool in the position transferring the preform;

FIG. 8 is a simplified diagram showing a view in section of a first embodiment of the holding element with a preform held by the latter;

FIG. 9 is a simplified diagram showing a view in section illustrating another embodiment of the holding element with a preform held by the latter;

FIG. 10 is a simplified diagram showing a view in section illustrating another possible embodiment of the holding element with a preform held by the latter;

FIG. 11 is a simplified diagram showing a view of one possible embodiment of the blowing station with the blow mold in a closed operating position;

FIG. 15 is a highly schematic, simplified diagram showing a plan view the injection molding tool and the blow mold.

Figure 1:
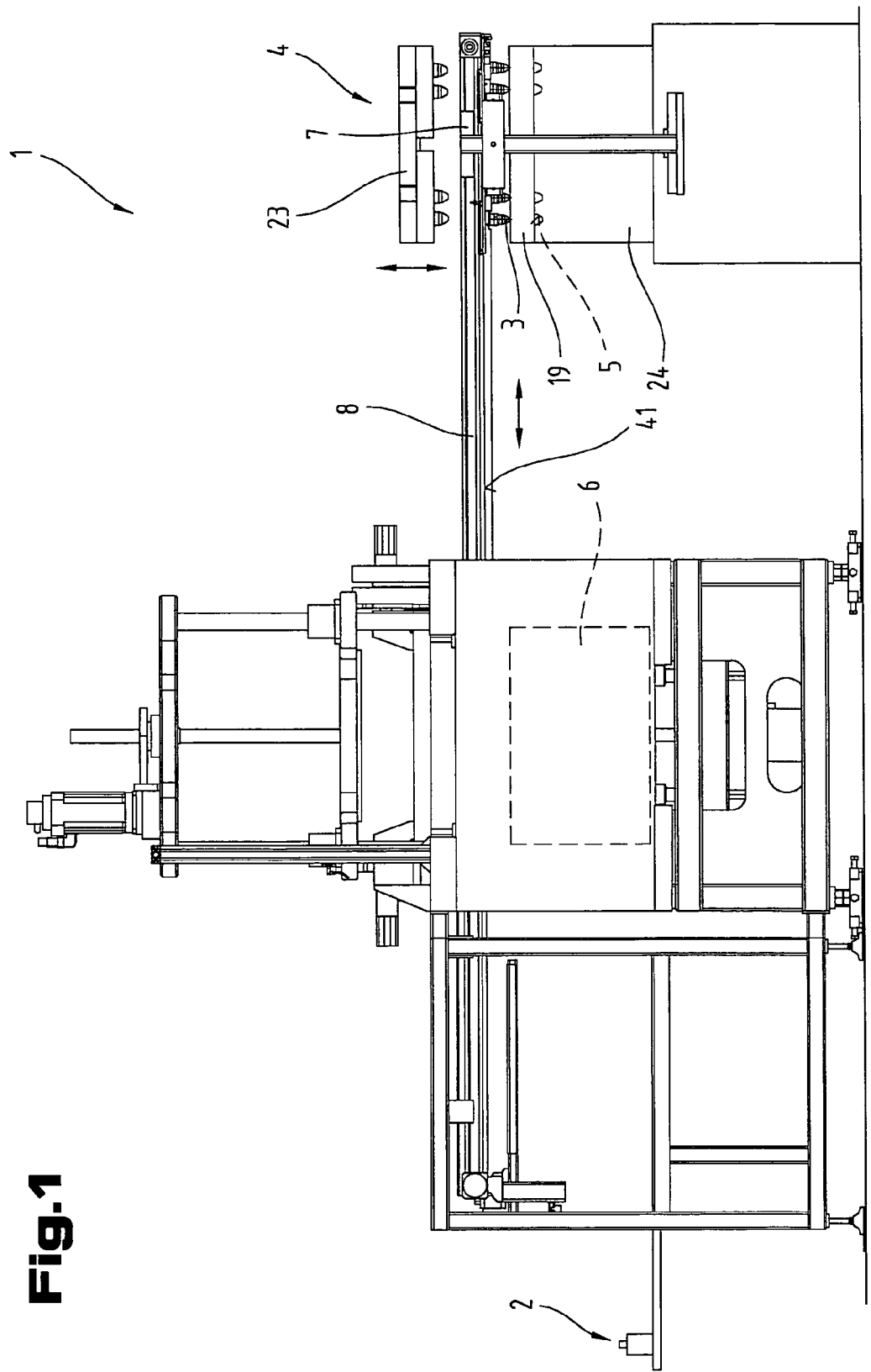
FIG. 1 is a simplified diagram illustrating a view in elevation of an installation proposed by the invention for producing hollow bodies from a preform.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIGS. 1 to 10 provide a simplified illustration of an installation 1 for producing hollow bodies 2 by injection molding and subsequent blow molding. In the case of the embodiment described and illustrated here, at a first station, at least one preform 3 is created in an injection molding tool 4, in which at least one cavity 5 is provided or disposed for this purpose. The preform 3 may also be described as a so-called blank, which is made by an injection molding process known per se from appropriately softened and processed plastic material by means of an extruder plant, not illustrated, constituting the injection molding tool 4.

At another station of the installation 1, the preform 3 is shaped to form the hollow body 2. In this respect, the final shaping also takes place by means of a process of molding the preform 3 to the finished hollow body 2 that is known per se. This other station comprises at least one blow mold 6 with appropriately designed driving and closing means co-operating with it, the molding of the preform 3 taking place in the closed blow mold 6. This station may therefore also be described as the final molding station or final shaping station.

The preform 3 is transported from the injection molding tool 4 to the blow mold 6 by means of a separate transfer means 7, which is moved backwards and forwards, preferably in a straight movement, on transport rails 8 illustrated on a simplified basis, at least between the injection molding tool 4 and the blow mold 6. A transport plane 41 defined by the transfer means 7 co-operating with the transport rails 8 is preferably horizontally oriented.

Figure 2:
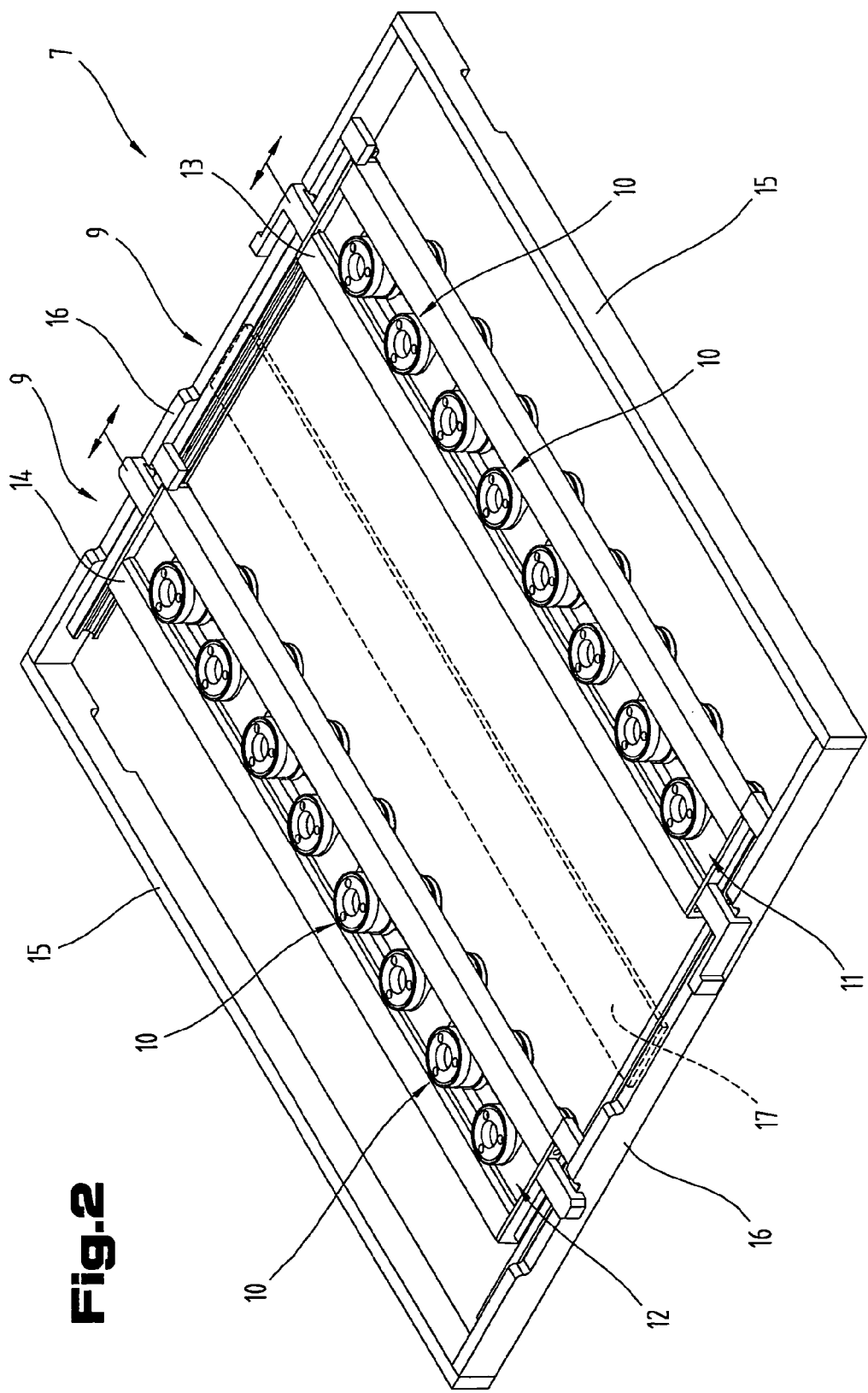
FIG. 2 is a simplified diagram illustrating a view from above of one possible embodiment of the transfer means for transporting hollow bodies to be produced from preforms.
Figure 3:
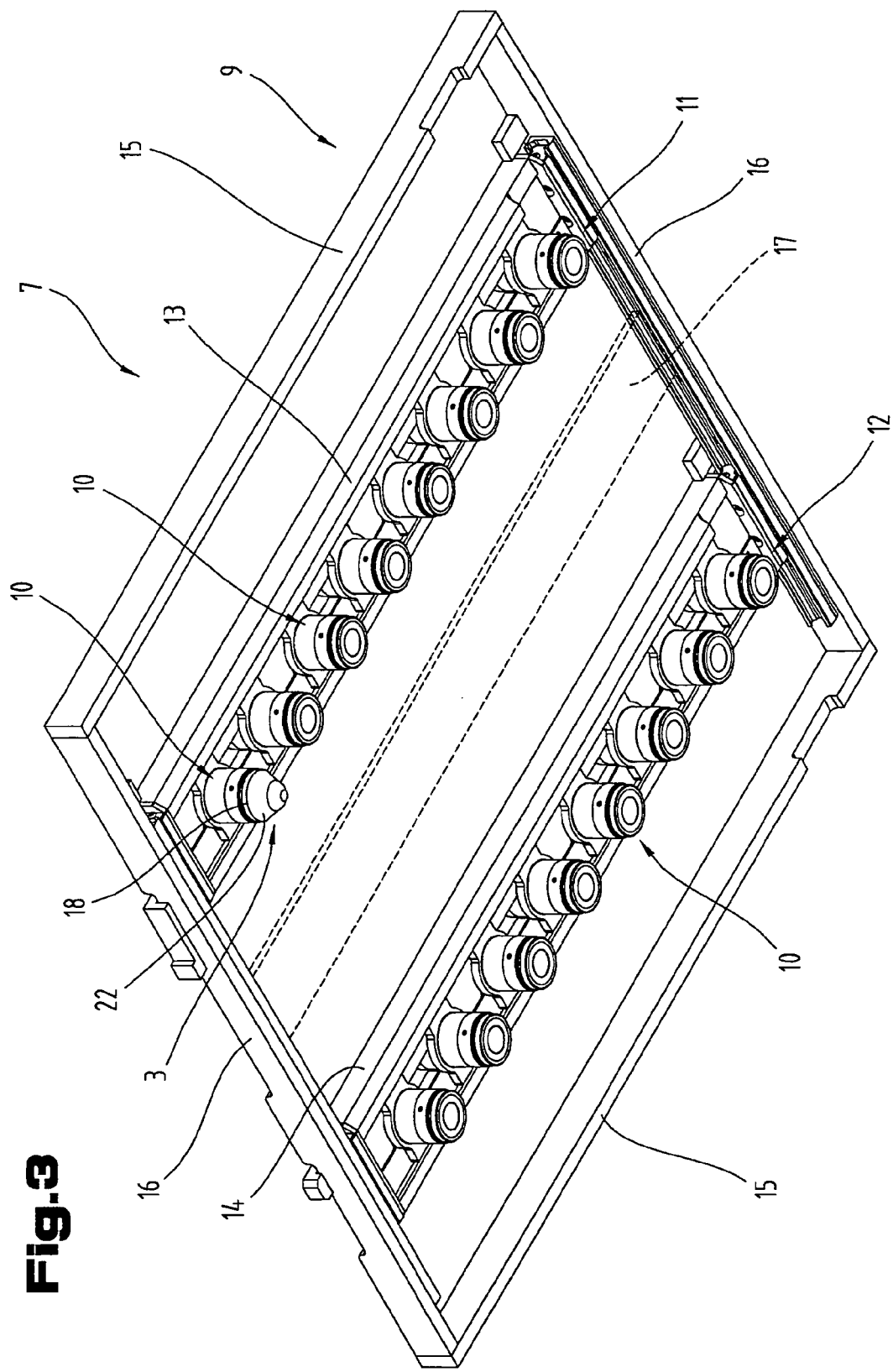
FIG. 3 is a simplified diagram illustrating a view of the transfer means illustrated in FIG. 2 from underneath.
Figure 4:
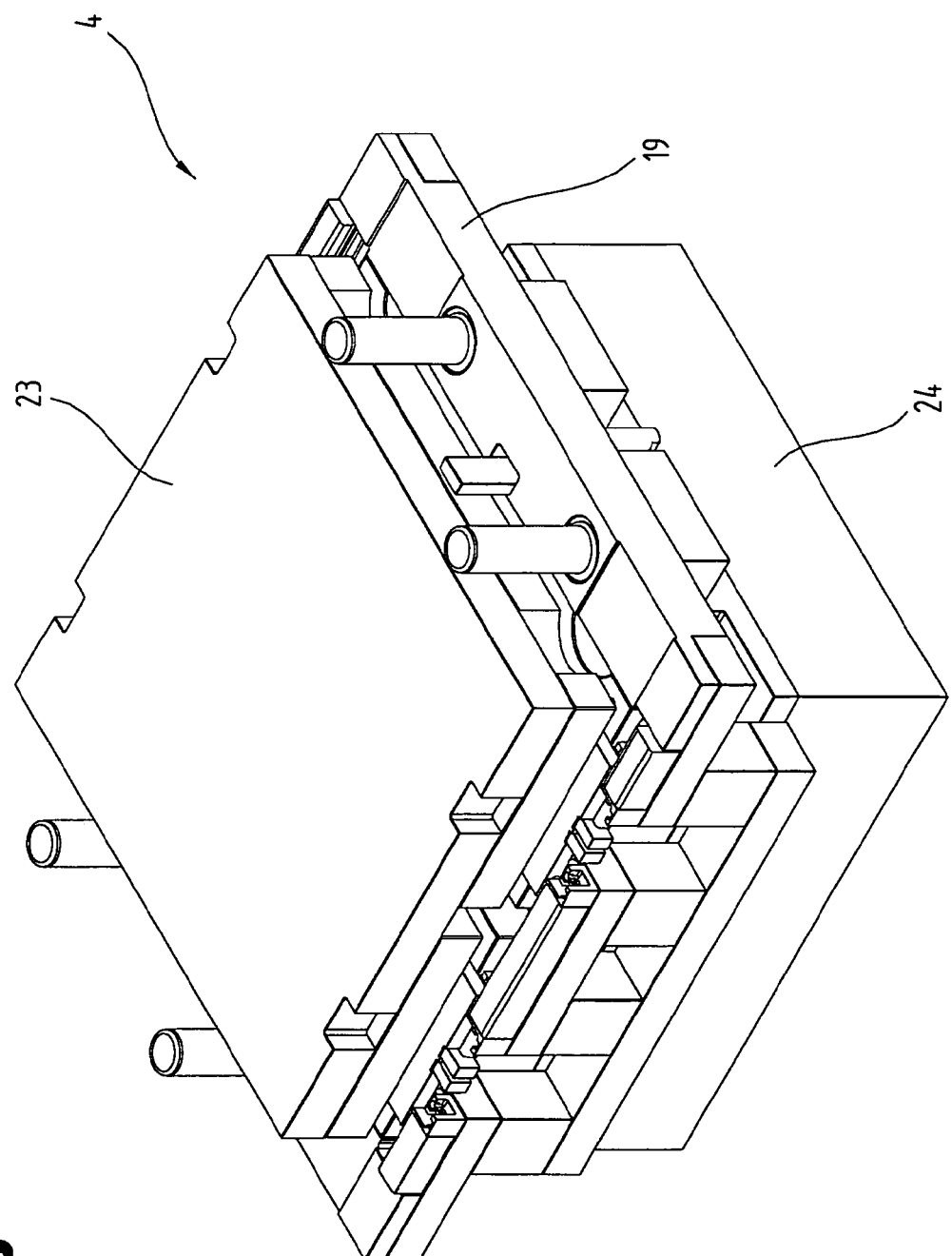
FIG. 4 is a simplified diagram illustrating the injection molding tool in the closed state.
Figure 5:
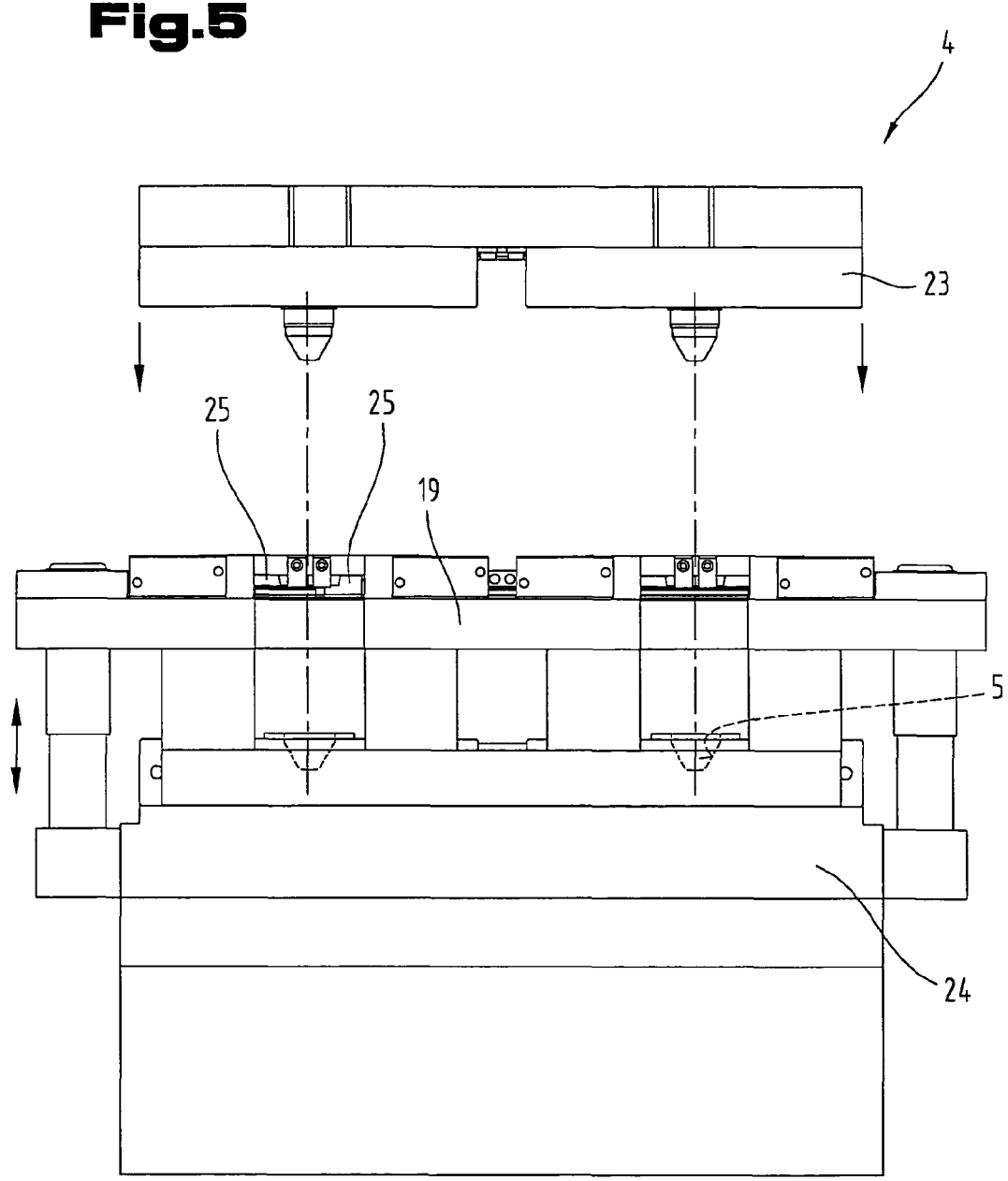
FIG. 5 is a view of the injection molding tool illustrated in FIG. 4 in an opened position.

As may be seen more clearly from FIGS. 2 and 3, the transfer means 7 comprises a carrying frame 9, on which at least one holding element 10 is disposed, optionally with a base plate 13, 14 displaceable relative to it connected in between for each preform 3. In this respect, it should be pointed out that the transfer means 7 with the holding element or elements 10 represents an independent invention in its own right without the other parts of the installation such as the injection molding tool 4, blow mold 6. The objective may be construed as being to propose a separate transfer means, by means of which the preform or preforms 3 can be easily and safely manipulated. This being the case, it is of advantage if the preform 3 held on the respective holding element 10 by the inside of its neck continuation 18 is taken over by the injection molding tool 4 and then always held continually until the final shaping and onward transport to a discharge station by the same holding element 10 so that the shaping and/or processing operations can be run without further obstacle. Accordingly, a separate transfer means 7 means is proposed, by means of which there is unhindered access to the entire external face of the preform 3 through to the finished hollow body 2 at all times.

In the embodiment illustrated as an example here, a plurality of holding elements 10 is provided on the transfer means 7, disposed one after the other in a first holding element group 11 as viewed in the transport direction of the carrying frame 9 between the injection molding tool 4 and the blow mold 6. Disposed parallel with the first holding element group 11 as viewed in the transport direction is another holding element group 12 adjacent to the first holding element group 11 with another plurality of holding elements 10. The individual holding elements 10 of each of the holding element groups 11, 12 are respectively disposed on a first and another base plate 13, 14. Each of the base plates 13, 14 is mounted so as to be displaceable on and relative to the carrying frame 9 in the direction extending transversely to the transport direction of the carrying frame 9. This is indicated in a simplified manner for each of the base plates 13, 14 by arrows. This transverse displacement or lateral movement of the individual holding elements 10, in particular with the inter-connected base plates 13, 14, relative to the carrying frame 9 will be explained in more detail below in connection with the blow mold 6.

The simplest embodiment would be one where two or more holding elements 10 were disposed adjacent to one another or one after the other on the carrying frame 9 as viewed in the transport direction and each of the holding elements 10 were displaceable in the transport plane 41, preferably independently of one another, in the direction extending transversely to the transport direction. The number of holding elements 10 and holding element groups 11, 12 can be freely selected depending on the number and three-dimensional shape of the preforms 3 and hollow bodies 2 to be produced.

In the embodiment illustrated as an example here, the carrying frame 9 is of a window-type design and comprises peripherally disposed longitudinal webs 15 as well as transverse webs 16 connecting the longitudinal webs 15. At least one connecting web 17 extends between the transverse webs 16 parallel with the two longitudinal webs 15. If several holding element groups 11, 12 are disposed adjacent to one another, the size of the carrying frame 9 will be adapted accordingly, in which case several connecting webs 17 may also be provided. In the window-type gaps between the individual webs, the two base plates 13, 14 in this instance are mounted so that they are guided on the transverse webs 16 in the direction perpendicular to the longitudinal extension of the longitudinal webs 15. This enables the relative displacement of the individual holding elements 10 relative to the carrying frame 9.

As may be seen more clearly from FIGS. 4 to 7, the holding element or elements 10 is or are disposed on the transfer means 7 in such a way that when the injection molding tool 4 is opened and the transfer position of the preform 3 to the transfer means 7 is assumed, they are inserted in the interior of the neck continuation 18 whilst the preform 3 is still being held by the outside of its neck continuation 18 by a tool part 19 of the injection molding tool 4. Beforehand, following the opening movement of the injection molding tool 4, the preform 3 is removed from the cavity 5 by means of this tool part 19. Accordingly, a part-portion of the tool part 19 shapes the external contour of the preform 3 in the region of its neck continuation 18. After opening the injection molding tool 4 and raising or lifting the preform 3 out of the cavity 5 and releasing its hold in the region of the outside of its collar, the internal face 20 of the neck continuation 18 is freely accessible.

In the case of a vertical opening movement of the injection molding tool 4 and the likewise vertical or perpendicular removal of the preform 3 from the cavity 5, the preform or preforms 3 can be transferred to the transfer means 7, in particular its holding elements 10. For this purpose, the transfer means 7 is moved between the opened injection molding tool parts, such as mold halves 23, 24, and held positioned in a corresponding position relative to the cavities 5. The preforms 3 are placed on or inserted in the holding elements 10 by lifting the tool part 19. The transfer movement between the opened injection molding tool 4, in particular the mold half 24 lying at the bottom in this instance, and the holding element 10 disposed on the transfer means 7 is effected in a displacement direction or transport direction oriented perpendicular to the transport plane 42. The preform 3 is therefore placed on the holding element 10 by the inside of its neck continuation 18 and the holding element 10 thus moved into contact with the internal face 20 of the neck continuation 18. Accordingly, the preform 3 is supported on the holding element 10 by its neck continuation 18. The preform 3 is therefore transferred between the opened injection molding tool 4 and the transfer means 7, in particular holding element or elements 10 disposed on it. A longitudinal axis 60 defined by the neck continuation 18 is therefore oriented in a perpendicular orientation relative to the transport plane 41. The cavities 5 are also disposed in the injection molding tool 4 and in the blow mold 6 with their longitudinal axes oriented perpendicular to the transport plane 41. This prevents any turning or change in position of the longitudinal axis 60 of the neck continuation 18 during the entire production process, and the orientation of the longitudinal axis 60 always remains the same relative to the transport plane 41.

Having removed the preform 3 in a controlled manner, it is transferred to the holding element 10 and once the preform 3 has assumed an appropriate hold seating on the holding element 10, the preform 3 is released by the tool part 19. This results in a switch from the initial hold of the neck continuation 18 from the outside in the first place to a hold on the transfer means 7, in particular the holding elements 10, from the inside.

To ensure there is sufficient space in the region of the collar interior during subsequent ongoing shaping, the holding element 10 should have at least one gap in the region of its center to enable a stretching arbor to be moved into the interior of the preform 3 if necessary and thus enable another step of the shaping process to be run. It is therefore of advantage if the holding element 10 has several retaining arms 21 distributed around its outer periphery.

In the case of hollow bodies 2 produced in this manner, it is standard practice to make the neck continuation 18 constituting the coupling piece to its final shape during the course of the injection molding process already, and it is not until after that that the hollow body part 22 adjoining the neck continuation 18 is formed during the course of the blowing operation to obtain the final three-dimensional shape of the hollow body 2.

The essential factor here is that in the region of the transfer means 7, the preform 3 is held by the region of the inside of the neck continuation 18. This is achieved by the transfer of the tool part 19 to the transfer means 7, and the preform 3 also continues to be held on the transfer means 7 from the inside during the blowing process that will be described below.

In order to obtain a good hold or clamping action for the preform 3 on the holding element 10, the retaining arms 21 have a bigger external dimension in a position disposed outside of the preform 3 than the internal cross-section of the neck continuation 18 accommodating the retaining arms 21. In this respect, the retaining arms 21 should be of an elastically deformable and/or radially displaceable design.

The design of the holding element 10 with the retaining arms 21 optionally disposed on it will depend on the selected cross-section of the neck continuation 18. The neck continuation 18 usually has a round, tubular cross-section to make it easy to close the opening of the hollow body 2 with a closure element, although this is not illustrated. This might be a cap, screw-top closure, crown cap or similar.

In its simplest embodiment, as described above, the holding element 10 is mounted on the carrying frame 9 so as to be displaceable relative thereto transversely to the transport direction of the carrying frame 9 between the injection molding tool 4 and the blow mold 6. This would be the most basic design and disposition of a holding element 10 on the carrying frame 9 of the transfer means 7. However, it is preferable to opt for a multiple arrangement of holding elements 10 in holding element groups 11, 12 as illustrated and described above.

The corresponding positioning and guide arrangement for displacing the individual holding element groups 11, 12 transversely may best be seen from FIGS. 2 and 3 and the transverse displacement of the holding element groups 11, 12, in particular the base plates 13, 14, relative to the carrying frame 9 may take place automatically during the course of tool movements and/or alternatively under the control of drive means, not illustrated.

The carrying frame 9 is usually guided by means of a guide arrangement in a straight trans-porting movement between the injection molding tool 4 and the blow mold 6. The transport rails 8 described above may be used for this purpose.

When the injection molding tool 4 is closed, the tool part 19 for shaping the neck continuation 18 is disposed between the mold halves 23, 24 of the injection molding tool 4 and the tool part 19 is mounted so as to be displaceable in the direction perpendicular to a dividing plane between the mold halves 23, 24. To enable the preform 3 to be released to the holding element 10, it is necessary for each individual forming section of the tool part 19 for shaping the neck continuation 18 to be split around the periphery of the neck continuation 18. To this end, individual tool part segments 25 may be provided, which are mounted so as to be displaceable relative to the tool part 19. This releasing movement may take place in the manner of a tilting movement or alternatively a movement in the direction parallel with the dividing plane of the mold halves 23, 24.

The individual tool part segments 25 are also preferably split as viewed in the transport direction so that once the preforms 3 have been transferred to the holding elements 10, the release can be effected by means of a simple sideways transverse displacement. Due to a preferably conical taper of the tool part segments 25 facing one of the cavities 5, not only can the latter be automatically centered relative to one of the mold halves 23, 24, the tool part segments 25 can also be placed one against the other and closed if the tool part segments 25 are diametrically split to enable the entire neck continuation 18 to be formed.

During the operation of producing the hollow body 2 chosen here, the preform 3 produced in the injection molding tool 4 is not cooled to any significant degree so that after transporting the preform 3 to the blow mold 6, the blowing operation to obtain the finished hollow bodies 2 can be run, optionally without applying additional energy or heat. If necessary, a sufficient or appropriate additional quantity of heat may be applied to the preform 3, in particular its hollow body part 22, even before the start of the blowing operation to ensure that the hollow body part 22 to be shaped will deform. This will depend on the chosen method sequence and geometry of the hollow body 2 to be produced and can be freely selected.

In the embodiment illustrated as an example here, however, the intention is to remove the preform 3 directly from injection molding tool 4 by means of the tool part 19 and transfer it to the holding element 10 of the transfer means 7 without applying additional thermal energy. Onward transport to the other station, namely the shaping station with the blow mold 6, takes place immediately. In the blow mold 6, the process of final shaping to the hollow body 2 takes place.

As may be seen by comparing FIGS. 7 and 8, the position in which the preform 3 is transferred to the holding element 10 of the transfer means 7 and placed in contact with the holding element 10 by its internal face 20 is illustrated. In the embodiment illustrated as an example here, the holding element 10 comprises several retaining arms 21 distributed around the periphery, which generate a sufficient clamping action for the preform 3 to be held thereon. Due to the peripherally cambered design of the individual retaining arms 21 and the peripheral spacing of the latter from one another, there is always a sufficient retaining force for the transport operation, even in the event of slight variances from the cross-sectional dimension of the neck continuation 18. The individual retaining arms 21 constitute part of the holding element 10 disposed by first ends on the side facing away from the hollow body part 22 as viewed peripherally, where they remain stationary. The other end of each retaining arm 21 is not disposed on the holding element 10 in a fixed or stationary arrangement and is therefore able to move freely within certain limits.

The retaining arms 21 enable the preforms and hollow bodies held on them to be individually retained or clamped in the region of the holding elements 10. Due to the plurality of retaining arms 10 provided, a central positioning of the preform 3 and hollow body 2 can be obtained relative to the holding element 10. This also enables better positioning of the preforms to be shaped 3 in the region of the blow mold 6.

Due to the intrinsic elasticity of the retaining arms 21, any slight tolerances can also be compensated and the preforms 3 and hollow bodies 2 nevertheless perfectly retained and positioned on the holding element 10.

In addition, it is also possible to provide a seal element 27 on the holding element 10 in the region of an end face 26 of the neck continuation 18, in order to establish a sealing contact of the end face 26 on a retaining portion of the holding element 10. This prevents the blowing air needed for forming from escaping out of the interior of the hollow body 2 to be produced. The seal element 27 described and illustrated here is provided in the form of an O-ring.

FIG. 9 illustrates another possible embodiment of a holding element 10 which may optionally be construed independently in its own right, the same parts being denoted by the same reference numbers and component names as those used in connection with FIGS. 1 to 8. To avoid unnecessary repetition, reference may be made to the detailed description of FIGS. 1 to 8 above.

The holding element 10 for holding the preform 3 illustrated on a larger scale here comprises at least one arcuately designed retaining arm 28, provided in the form of a tubular segment. Another part-portion of the holding element 10, on the other hand, is provided in the form of a stationary retaining part 29, which likewise has a tubular segment-shaped three-dimensional shape. This stationary retaining part 29 is connected to the retaining arm 28 described above and it is preferable to opt for an integral design. The retaining arm is in turn provided in the form of a resilient element to enable the requisite retaining force to be generated. This design can be achieved, for example, by firstly making a circumferentially extending retaining part 29 in the region of the holding element 10 and then partially separating the retaining part 29 to create at least one retaining arm 28. This may be done on the basis of appropriately oriented cuts followed by deformation and/or processing.

The seal element 27 described above may again be provided in the region of the end face 26 of the preform 3 to establish a sealing contact of the preform 3 on the holding element 10. By contrast with the embodiment described in connection with FIGS. 7 and 8, a flat circular element is used in this instance.

FIG. 10 illustrates another, optionally independent embodiment of a holding element 10 for the transfer means 7, and to avoid unnecessary repetition, reference may be made to the detailed description of FIGS. 1 to 9 above. Again, the same parts are denoted by the same reference numbers and component names as those used in connection with FIGS. 1 to 9 above.

In the embodiment illustrated here, a part-portion of the holding element 10 is provided in the form of a tubular component and has a holder 31 on its external face in which a holder element 32 is inserted. This holder element 32 may be provided as a circumferentially extending, integral component, the material of which has elastically deformable properties. Accordingly, the holder element 32 can be placed on the tubular component 30 of the holding element 10 and inserted in the holder 31 provided for this purpose, where it is retained. As viewed in cross-section, the holder element 32 in turn forms a retaining arm 33. In this example of an embodiment, it extends round continuously.

Irrespective of the above, however, it would also be possible for the holder element 32 to be of a circumferentially split design, in which case at least one axially extending separating region or separating portion is provided in the form of a material separation where the holder element 32 is split as viewed circumferentially. However, yet another option would be for the holder element 32 to be provided in the form of several individual segment parts, which can be inserted in the holder 31.

Due to the cambered external shape of the holder element 32 directed towards the internal face 20 as viewed in axial section, the desired contact of the retaining arm 33 formed by the holder element 32 on the internal face 20 of the neck continuation 18 can be obtained.

If the holder element 32 with its retaining arm or arms 33 is viewed in axial section, legs 34, 35 are disposed on either side of the contact region or support region on the internal face 20 of the neck continuation 18, which respectively extend on mutually remote sides towards the center of the holding element 10. A shoulder 36 is formed by a projection of the holder element 32 of a complementary design in the region of the end face 26 of the preform 3, on which at least a part-portion of the end face 26, in particular a transition region from the internal face 20 of the neck continuation 18 to the end face 26, is supported. If the holder element 32 is again made from an elastically deformable material, the desired seal of the interior of the preform 3 needed for the blowing operation can be obtained in this region.

Irrespective of the above, another independent embodiment of a holding element 10 of the transfer means 7 is possible, whereby the holding element 10 has a separate holder element 61 on its external face directed towards the neck continuation 18, which can be displaced between a release position and a clamping position, as will be described in more detail below with reference to FIG. 14. For example, this may be achieved by disposing the elastically deformable holder element 61 on the tubular component 30 of the holding element 10 and displacing it between the two positions by pressurizing medium. The holder element 61 may either extend continuously around the entire circumference or alternatively around only parts of the circumference of the holding element 10. If pressurizing medium is delivered to a cooperating passage in the tubular component 30 or disposed behind it and to the holder element 61, the holder element 61 will deform radially, thereby making the external circumference larger. As a result, the holder element or elements 61 comes or come into contact with the internal face 20 of the neck continuation 18 enabling the preform 3 to be held or clamped as desired.

The holding element 10 with its variable elastic element may be inserted by its initially small cross-sectional dimension in the neck continuation 18. After this, the elastic element is radially widened, for example by a pressurizing medium such as hydraulic oil, pneumatic pressurizing media, and brought into contact with the internal face 20. This has the effect of holding the preform 3 and the hollow body 2 subsequently produced from it.

It would also be possible for the holding element 10 to be provided with a separate passage for tempering medium, in particular a coolant passage, which is connected to a supply system by means of supply and discharge lines. This would enable the preform 3 to be tempered immediately after transferring it to the tool part 19, at least in the region of its neck continuation 18, in particular enabling thermal energy to be dissipated.

Figure 12:
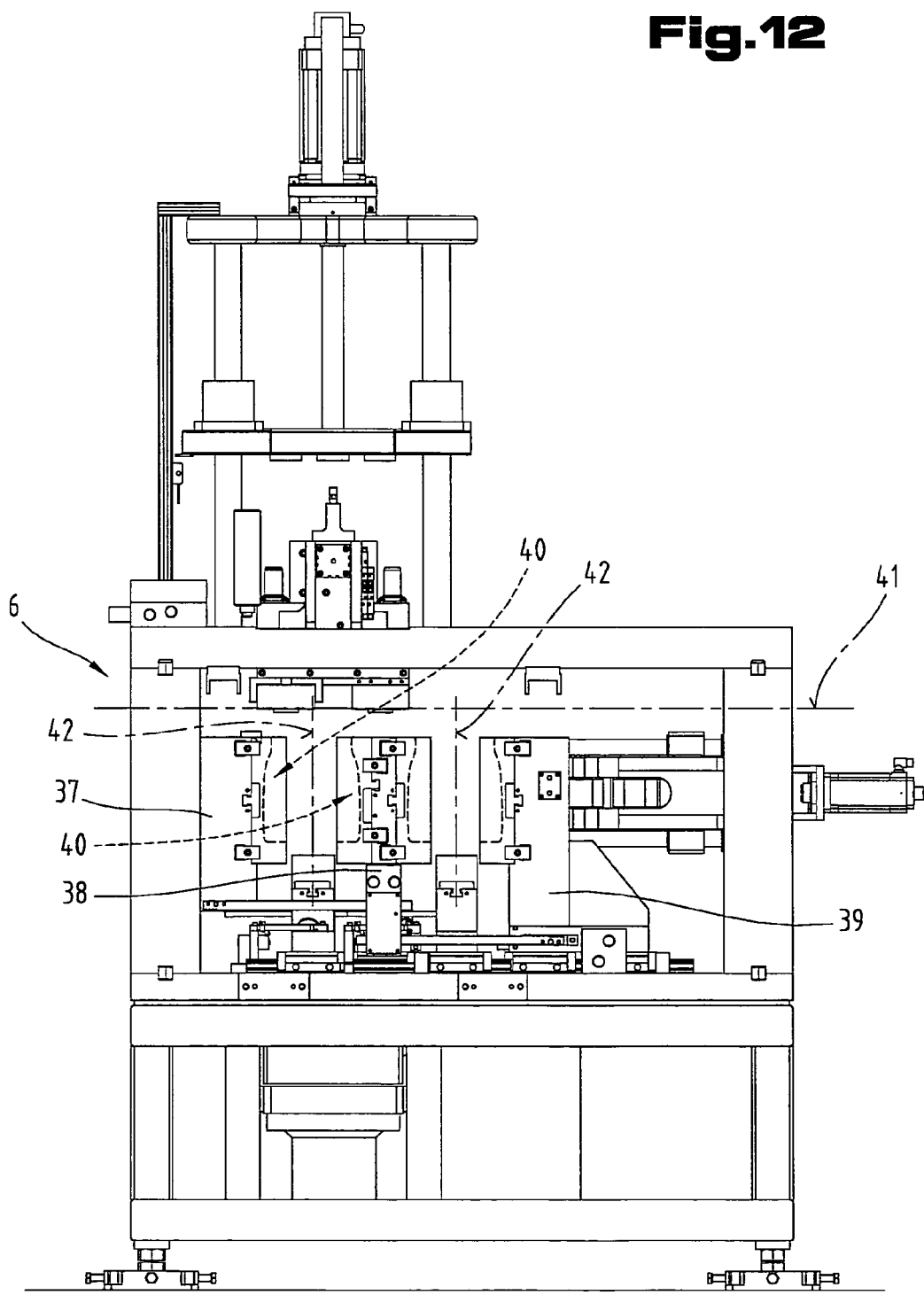
FIG. 12 is a simplified diagram showing a view of the blowing station illustrated in FIG. 11 but with the blow mold opened.

FIGS. 11 and 12 illustrate the blowing station with the blow mold 6 in which the preforms 3 transferred to the injection molding tool 4 are formed to produce finished hollow bodies 2 after closing the blow mold 6.

FIG. 12 illustrates an opened position and FIG. 11 the closed position of the blow mold 6, which is in turn made up of several blow mold parts 37 to 39 disposed adjacent to one another as viewed in the transport direction. In the embodiment illustrated as an example here, two mutually adjacent rows of preforms 3 are set up in the injection molding tool 4 by the transfer means 7 and a corresponding number and disposition of cavities are provided in the region of the blow mold 6.

As a minimum number, the blow mold 6 comprises two of such blow mold parts 37, 38.

As described above, immediately after being produced, the preforms 3 are picked up by the common transfer means 7 and moved to the blow mold 6, where they are placed in the opened blow mold 6 in readiness for the blowing operation. After closing the blow mold parts 37 to 39, the individual preforms 3 continue to be held by the holding elements 10 co-operating with them. Due to the fact that the individual preforms 3 are held in the region of the inner face or internal face 20 of the neck continuation 18 in this embodiment, the blow mold 6 can easily be closed during the blowing operation because the neck continuation 18 is picked up and held by its external face in the cavity 40 of the blow mold 6 provided for this purpose. After closing the blow mold 6, the other forming means is introduced into the interior of the hollow body 22 in a known manner by the tubular component 30 of the holding elements 10 described above. Depending on the desired type of forming, this might be a stretching tool, which causes an axial stretching of the preform 3, thereby making it longer in the axial direction. The final forming operation is then run with a pressurizing medium in gaseous and/or liquid form. This is usually done using pressurized air.

In this embodiment, the stretching tool is driven by a servo-drive to enable the stretching tool to be moved more effectively and accurately. The hollow body part 22 is firstly stretched in the axial direction by the stretching tool, thereby resulting in a dimension which is longer in the axial direction than the finished hollow body 2. To this end, a mold insert constituting the base is also moved out of the cavity by a corresponding amount to enable this stretching movement. The stretching tool deforms the material far enough to obtain the predefined amount. The form insert constituting the base is then moved back in the direction towards the neck continuation, care being taken to ensure that the stretching tool is supported against the mold insert constituting the base by its end face with a pre-settable resistance whilst clamping the base wall of the hollow body 2 and moving it back by means of this mold insert. This centers the base relative to the longitudinal axis. During this operation, the blowing operation can be initiated already to enable a bigger or thicker base wall thickness to be obtained.

Once the final shaping operation has taken place and the hollow body 2 cooled accordingly, the blow mold 6 can be opened. This is illustrated in the diagram of FIG. 11. Since the finished hollow body 2 may have a bigger cross-sectional dimension than the preform 3, an appropriate opening movement of the blow mold 6 is necessary. In the embodiment illustrated as an example here, the blow mold part 37 illustrated on the left-hand side is retained in a stationary arrangement on a base frame, whereas the other blow mold parts 37 and 38 are moved relative to the stationary blow mold part 37 in the direction extending transversely to the transport direction, usually in a horizontal plane. This is done by appropriate actuating means to obtain the requisite opening movement. A mechanical coupling might be used for this purpose, provided in the form of a stack mold of a type known per se.

Due to the sideways opening movement of blow mold parts 38, 39 displaceable relative to the stationary blow mold part 37, there is now sufficient space for a transverse displacement to enable the finished hollow bodies 2 together with the holding element 10 on the carrying frame 9 to be unmolded. The opening and closing movement of the displaceable blow mold parts 38, 39 is effected by means of a toggle drive. The sideways transverse movement of the holding elements 10 was described in detail above. It enables the transfer means 7 with its carrying frame 9 to be moved in a straight line in the transport direction from the injection molding tool 4 to the blow mold 6 and from the latter on to another station, for example a discharge station and/or inspection station.

Due to the relative transverse movement of the individual holding elements 10, optionally with the inter-connected base plates 13, 14, it is now possible for the finished hollow bodies 2 to be easily removed from the mold, even with a straight transporting movement of the transfer means 7 in the region of the laterally opening blow mold parts 38, 39 of the blow mold 6. The transfer means 7 described above is preferably guided in a horizontally oriented transport plane 41 between the individual stations of the installation 1. The transport direction of the transfer means 7 from the injection molding tool 4 to the blow mold 6 constitutes another, preferably straight, spatial direction. The blow mold 6 with its blow mold parts 37 to 39 can then be divided in a vertically oriented dividing plane 42 as viewed in the transport direction of the transfer means. Accordingly, the individual blow mold parts 38 and 39 are displaceable relative to one another, guided on a base frame in a plane oriented parallel with the transport plane 41 and perpendicular to the dividing plane 42. The displacement path of the outermost blow mold parts 39 relative to the stationary blow mold part 37 is longer than the displacement path of the first displaceable blow mold part 38. The displacement path of the outermost blow mold part 39 may be approximately twice the displacement path of the first displaceable blow mold part 38.

After opening the blow mold 6 by its blow mold parts 37 to 39 and moving the holding elements 10 to the side relative to the carrying frame 9, the finished hollow bodies 2 can be moved from the blow mold 6 and then transported onward unhindered and discharged. This discharge is usually onto a transport device, such as a conveyor belt or similar, by means of which the individual hollow bodies 2 are moved on to a warehouse and/or to an inspection station disposed directly downstream. A quality inspection may take place in this downstream inspection station, for example, during which actual features on the hollow bodies 2 are highlighted and after detecting the actual features, the latter are compared with predefined desired or quality features. These features might be the seal, lack of tears, wall thickness distribution, etc., of the hollow body 2, for example. If there is no match or too great a variation from the desired value, the hollow body 2 is rejected.

In this respect, it should be pointed out that the blow mold 6 as well as the entire blowing station may each be construed as independent embodiments of the invention in their own right. This being the case, the objective may be regard as being that of proposing a blow mold 6 by means of which a simple process of removing the hollow bodies 2 produced in it can be obtained. The fact that one blow mold part 37 is retained in a stationary arrangement at the side on a base frame and the other blow mold parts 38 and 39 can be moved in a sideways direction relative to the transport direction of the transfer means 7 whilst maintaining the straight transport direction, enables a relative offset of the hollow bodies 2 on the carrying frame 9 via the holding elements 10. This enables the guide elements for the transfer means to be made to a straight design in the region of the blow mold 6.

However, the blow mold 6 is preferably completed by the installation elements described above to form the installation 1.

The method sequence for producing the hollow body or bodies 2 from the preform 3 produced by injection molding involves injecting the preform or preforms 3 in a corresponding number and mutual orientation in the injection molding tool 4. When the material is in a state in which it can be formed, the preforms 3 are removed from the cavity 5 by means of the tool part 19 and transferred to the transfer means 7. This removal takes place with the injection molding tool opened by moving the transfer means 7 between the opened mold halves 23, 24.

Having been transferred in this retained arrangement, the preforms 3 are transported together to the blowing station with the opened blow mold 6. During this transport operation, the injection molding tool 4 can be closed by the mold halves 23, 24 and tool part 19 and a new injection operation run.

At the same time in the region of the blowing station with the blow mold 6 in the closed position, the final shaping to produce the hollow bodies 2 takes place. After shaping, the blow mold 6 is opened by moving the blow mold parts 38, 39 sideways and the finished hollow bodies 2 are released from the cavity or cavities 40 of the blow mold 6 by the holding elements 10 which are likewise moved sideways relative to the carrying frame 9. This is followed by onward transportation to a discharge and/or inspection station. After this discharge or transfer to the inspection station, the transfer means 7 is moved through the blowing station to the injection molding tool 4 into which preforms 3 have already been injected in the meantime. The cyclical sequence then starts again.

Figure 13:
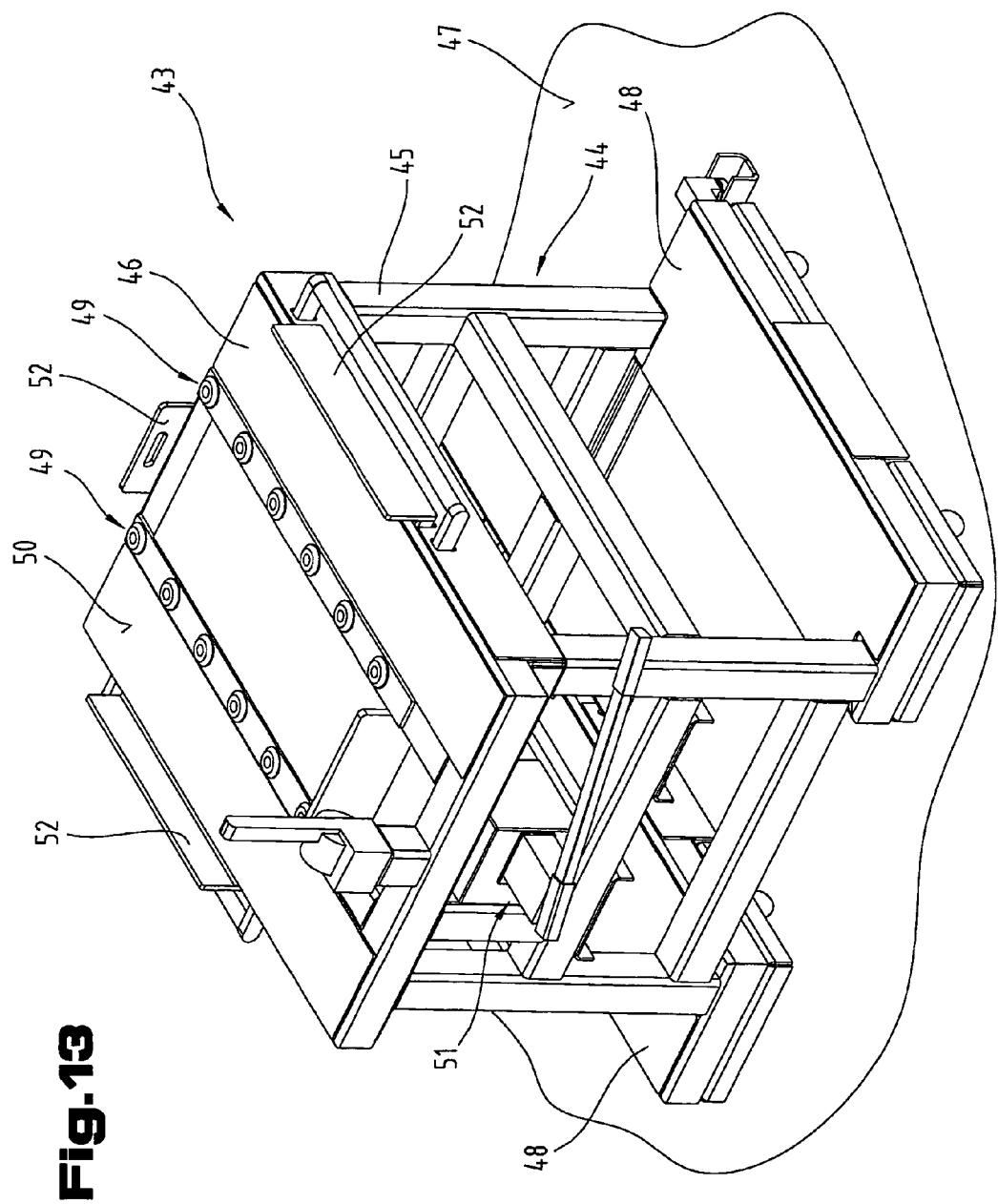
FIG. 13 is a simplified diagram showing one possible and optionally independent embodiment in its own right of a tool carriage to assist mounting of the injection molding tool.

FIG. 13 illustrates an embodiment of a mounting aid unit 43, which may optionally also be construed as an independent embodiment in its own right, in the form of a transport carriage 44, by means of which the mold halves 23, 24 of the injection molding tool 4 described above can be inserted in the installation 1 and removed again. This mounting aid unit or mounting aid device is used in situations where access is no longer possible with crane equipment usually used for this purpose. This is the case here because the larger mold halves 23, 24 viewed relative to one another are in a position disposed one above the other. Accordingly, the objective of the invention may be regarded as being that of enabling the mounting of individual components, such as mold parts or mold halves 23, 24 of the injection molding tool 4, so that they can be easily and reliably inserted in the installation 1 and removed from it again.

The transport carriage 44 of the mounting aid unit 43 comprises a base frame 45, which bears a support plate 46 on its top face. In the region of a standing surface 47, such as a hall floor or similar, support elements 48 are provided for supporting the base frame 45 on the standing surface 47. The base frame 45 may comprise a support frame with several mutually connected uprights and struts, specifically chosen to take the weight or mass of the parts of the injection molding tool 4. The support elements 48 accommodate in bearing or support means, by means of which the entire mounting aid unit 43 can be moved relative to the standing surface 47. These bearing or support means might be rolls, rollers, ball bearings, belts or even inflated cushion elements, for example, which enable the entire mounting aid unit 43 to be moved easily on the standing surface 47 with the mold part of the injection molding tool 4 which has to be moved. Several of the inflated cushion elements are preferably assembled to form a common air gliding cushion system, thereby enabling a safer movement of the entire mounting aid unit 43 relative to the standing surface 47. The inflated cushion element or elements is or are preferably disposed in each corner region of the base frame 45 inside the support elements 48.

To enable a sliding movement of the mold part of the injection molding tool 4 supported on the support plate 46, several roll elements 49 may be provided on the support plate 46. The latter are preferably provided in a plurality in a row disposed one after the other and are usually provided in the form of ball bearings or similar. To enable a relative displacement of the mold part of the injection molding tool 4, not illustrated, relative to the support plate 46, the individual roll elements 49 are disposed so as to be displaceable in the vertical direction relative to a support surface 50 of the support plate 46 which is preferably oriented parallel with the standing surface 47. By varying the distance of the individual roll elements 49 relative to the support surface 50, the mold part supported on the support surface can be lifted, the support then being provided by these roll elements 49. Hydraulic, pneumatic or alternatively mechanical pressurizing medium may be used for lifting purposes. In the case of hydraulic or pneumatic pressurizing medium, an operating device 51 is disposed in the region underneath the support plate 46, illustrated on a simplified basis. This might be a manually operated pump, for example, in particular a hydraulic pump, by means of which the individual roll elements 49 can be lifted relative to the support surface 50. Since the injection molding tool 4 or a mold part thereof is supported on the roll elements 49 in the raised position, a simple sliding movement into the installation 1 and back out of it can be effected.

To prevent the mold part of the injection molding tool 4 from inadvertently slipping or moving relative to the support plate 46, the roll elements 49 may engage in a groove-shaped recess of the tool part of the injection molding tool 4. In addition, at least one but preferably several locking elements 52 may be provided in the peripheral regions of the support plate 46. These may either serve as stops and/or also assume a certain guiding function.

To enable the mold parts, in particular the mold halves 23, 24, of the injection molding tool 4 to be not only held on the installation parts provided for this purpose in the region of the installation 1 but also moved relative thereto during mounting and dismantling, it may be of advantage to provide co-operating roll elements 49 here too, so that, from the mounting aid unit 43, the mold halves 23, 24 or tool part 19 can be mounted from the mounting aid unit 43 in the installation 1 and also dismantled from the latter again.

When mounting and/or dismantling individual tool parts of the injection molding tool 4 in conjunction with the transport carriage 44 of the mounting aid unit 43, allowance must be made for adapting the distance of the support surface 50 from the standing surface 47 in terms of level relative to the holders of the mold parts, in particular the mold halves 23, 24 and the tool parts 19 of the injection molding tool 4 of the installation 1. In this respect, a minimum adjustment of the two levels relative to one another can be undertaken whilst offloading or picking up the tool parts by means of the vertically displaceable roll elements 49 in the region of both the transport carriage 44 and the installation 1.

Figure 14:
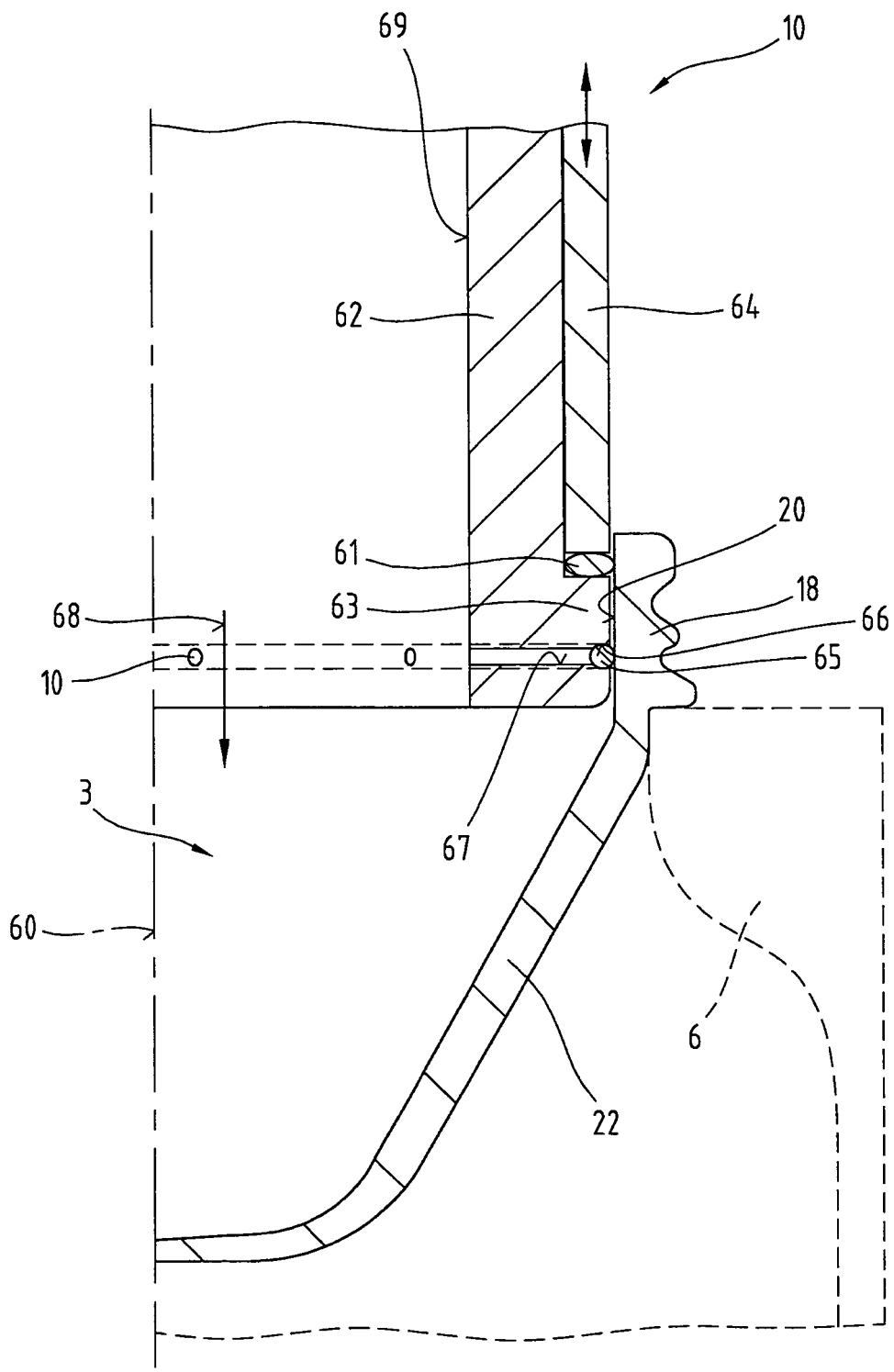
FIG. 14 is a view in section showing another possible embodiment of a holding element with a preform held by the latter.

FIG. 14 illustrates another holding element 10, which may optionally be construed as an independent embodiment in its own right, the same reference numbers and component names being used to denote the same parts as those used in connection with FIGS. 1 to 13 above. To avoid unnecessary repetition, reference may be made to the detailed description of FIGS. 1 to 13 above.

As explained above, the preform 3 is again held on the holding element 10 and hence on the transfer means 7 by its neck continuation 18. In this instance, the preform 3 has already been transferred from the injection molding tool 4 to the holding element 10 and in this position, can be moved from the injection molding tool 4 to the blow mold 6 along the transport plane 41 by the transfer means 7.

In order to hold and clamp the neck continuation 18 on the holding element 10, the same holder element 61 as that described above is provided, made from an elastically deformable material. The holding element 61 has a support part 62 lying closer to the longitudinal axis 60, which has a radially projecting shoulder 63 in a region facing the neck continuation 18, on which the holder element 61 is supported in the axial direction. To enable the holder element 61 to be opened in the radial direction, the holding element 10 also has an actuator part 64, preferably disposed coaxially with the support part 62, which is displaceable in the axial direction relative to the support part 62 as indicated by the double arrow. When the actuator part 64 is moved in the direction towards the shoulder 63, the holder element 61 is deformed firstly in the axial direction, although an external dimension of the holder element 61 increases in the radial direction. The holder element 61 can therefore be moved into a clamping contact on the internal face 20 of the neck continuation 18. In this respect, it should be pointed out that it would also be possible for the actuator part 64 to remain stationary and for the support part 62 with its shoulder 63 to be moved in the axial direction towards the actuator part 64.

This is merely a reverse movement between the support part 62 with the actuator part 64. The holder element 61 is also disposed so that it can be displaced between a release position and a clamping position in order to hold the neck continuation 18.

Also illustrated in the region of the neck continuation 18, indicated by broken lines, is another part of the blow mold 6. This position is reached after the preform 3 has been transported into the region of the blowing station when the blow mold 6 is closed. In order to shape the desired hollow body 2 from the preform 3, the material of the preform 3 tempered to permit forming is shaped accordingly in a combined stretching and/or blowing operation, in a manner long known.

In order to obtain a sufficient seal for the blowing operation between the internal face 20 of the neck continuation 18 and holding element 10, a separate seal element 65 may be provided on the holding element 10 in the region of the internal face 20, as indicated, which may extend in a circumferentially extending holder groove 66. The holder groove 66 in turn communicates via a at least one axial passage 67 for applying pressure with blowing air 68 with an orifice 69 disposed centrally in the holding element 10.

The holding element 10 with its support part 62 thus forms an approximately tubular body, which forms the orifice 69 in its interior. This orifice 69 is used not only to supply the blowing air 68 but also to accommodate a stretching tool, not illustrated, as soon as the preform 3 is ready to be formed by a combined stretching and blowing operation.

An arrow in the region of the longitudinal axis 60 indicates the blowing air 68 needed for the forming operation, which is delivered to the interior of the preform 3 by known installation parts. Some of this blowing air 68 also passes into the passage or passages 67 and forces the seal element 65 into a sealing contact with the internal face 20 of the neck continuation 18. A sealing seat between the seal element 65 and the holder groove 66 in the holding element 10, in particular the support part 62, is maintained unaffected by the latter.

This enables a seal to be maintained in the interior during the forming operation in the region of the blowing station independently of holding the preform 3. When the pressure generated by the blowing air 68 is removed, the seal element 65 is also released from its sealing contact on the internal face 20 of the neck extension 18. This release takes place due to the intrinsic elastic properties of the material of the seal element 65. Irrespective of this, however, the hollow body 2 produced from the preform 3 continues to be held on the holding element 10 by the further deformed holder element 61. The hollow body 2 can therefore be removed from the blow mold 6 and transported on to the discharge station. This always takes place with the same holding element 10, which is disposed and held on the transfer means 7.

FIG. 15 illustrates another possible and optionally independent embodiment of a part of the installation 1, the same reference numbers and component names again being used as those used in connection with FIGS. 1 to 14 above. To avoid unnecessary repetition, reference may be made to the detailed description of FIGS. 1 to 14 above.

This is a simplified diagram showing a plan view of the injection molding tool 4 and the blow mold 6. As described above, the individual holding elements 10 disposed adjacent to one another in the transport direction and the holding element groups 11, 12 formed by them can be displaced relative to one another transversely to the transport direction. For the sake of simplicity, only a few cavities 5 are illustrated in the region of the injection molding tool 4 and they are also only schematically illustrated. The transport direction of the transfer means 7 between the injection molding tool 4 and the blow mold 6 is indicated by a double arrow. Also shown on a simplified basis are the transport rails 8 used to guide the transfer means 7 between the injection molding tool 4 and the blow mold 6. As viewed transversely to the transport direction, the cavities 5 have a transverse distance 70 in the region of the injection molding tool 4 which is smaller than another transverse distance 71 of the cavities provided in the region of the blow mold 6 for forming the hollow bodies 2. This is used to save on tool dimensions and costs in the region of the injection molding tool 4. This enlargement of the transverse distance 70 to the other transverse distance 71 is necessary to enable hollow bodies 2 with bigger volumes to be formed from the preforms 3, as explained in detail above.

In order to make a lengthways distance 72 in the transport direction bigger between individual cavities 5 of the injection molding tool 4 disposed one after the other in the transport direction and the cavities disposed one after the other in the blow mold 6, the individual holding elements 10 in the region of the transfer means 7 may also be held or mounted so that they can be displaced relative to one another in the transport direction.

Consequently, the lengthways distance 72 in the region of the injection molding tool 4 between cavities 5 disposed directly one after the other in the transport direction may be made larger to form another lengthways distance 73 in a manner similar to the cavity distance of the blow mold 6, the latter being of a bigger dimension than the first lengthways distance 72. The distances both in the transverse direction and in the longitudinal direction viewed relative to the transport direction may also be described as so-called pitch dimensions. To enable this additional relative longitudinal displacement of the individual holding elements 10 relative to one another, appropriate guide and displacement devices are provided in the region of the base plates 13, 14 of the transfer means 7 supporting and bearing the holding elements 10.

In all the described embodiments of the transfer means 7, the longitudinal axis 60 of the neck continuation 18 is always oriented with its internal face 20 in the direction perpendicular to the transport plane 41. The preform 3 is removed from the injection molding tool 4 by the tool part 19 by means of its tool part segments 25. This is done in an orientation perpendicular to the transport plane 41 and this is preferably a vertical direction of movement. Following the transfer and holding of the preform on the holding element 10, the orientation of the longitudinal axis 60 remains virtually unchanged.

The embodiments illustrated as examples represent possible variants of the installation 1, in particular the transfer means 7 and/or the blow mold 6, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Furthermore, individual features or combinations of features from the examples of embodiments described and illustrated may be construed as independently inventive solutions proposed by the invention.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

For the sake of good order, finally, it should be pointed out that, in order to provide a clearer understanding of the structure of the installation 1, in particular the transfer means 7 and/or the blow mold 6, they and their constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1; 2; 3; 4, 5, 6; 7; 8; 9; 10; 11, 12; 13; 14; 15 constitute independent solutions proposed by the invention in their own right. The objectives and associated solutions proposed by the invention may be found in the detailed descriptions of these drawings.

| | List of reference numbers |
|---|---|
| 1 | Installation |
| 2 | Hollow body |
| 3 | Preform |
| 4 | Injection molding tool |
| 5 | Cavity |
| 6 | Blow mold |
| 7 | Transfer means |
| 8 | Transport rail |
| 9 | Carrying frame |
| 10 | Holding element |
| 11 | Holding element group |
| 12 | Holding element group |
| 13 | Base plate |
| 14 | Base plate |
| 15 | Longitudinal web |
| 16 | Transverse web |
| 17 | Connecting web |
| 18 | Neck continuation |
| 19 | Tool part |
| 20 | Internal face |
| 21 | Retaining arm |
| 22 | Hollow body part |
| 23 | Mold half |
| 24 | Mold half |
| 25 | Tool part segment |
| 26 | End face |
| 27 | Seal element |
| 28 | Retaining arm |
| 29 | Retaining part |
| 30 | Component |
| 31 | Holder |
| 32 | Holder element |
| 33 | Retaining arm |
| 34 | Leg |
| 35 | Leg |
| 36 | Shoulder |
| 37 | Blow mold part |
| 38 | Blow mold part |
| 39 | Blow mold part |
| 40 | Cavity |
| 41 | Transport plane |
| 42 | Dividing plane |
| 43 | mounting aid unit |
| 44 | transport carriage |
| 45 | Base frame |
| 46 | Support plate |
| 47 | Standing surface |
| 48 | Support element |
| 49 | Roll element |
| 50 | Support surface |

-continued

| | List of reference numbers |
|---|---|
| 51 | Operating device |
| 52 | Locking element |
| 60 | Longitudinal axis |
| 61 | Holder element |
| 62 | Support part |
| 63 | Shoulder |
| 64 | Actuator part |
| 65 | Seal element |
| 66 | Holder groove |
| 67 | Passage |
| 68 | Blowing air |
| 69 | Orifice |
| 70 | Transverse distance |
| 71 | Transverse distance |
| 72 | Lengthways distance |
| 73 | Lengthways distance |

The invention claimed is:

1. Installation (1) for producing hollow bodies (2) by injection molding and subsequent blow molding, comprising an injection molding tool (4) with a tool part (19), at least one cavity (5) for producing a preform (3) with a neck continuation (18) and a hollow body part (22) adjoining the neck continuation (18), a blow mold (6) for shaping the hollow body (2) from the preform (3) and transfer means (7) for transporting the preform (3) from the injection molding tool (4) to the blow mold (6), wherein the transfer means (7) comprises a carrying frame (9) on which at least one holding element (10) for the at least one preform (3) is disposed and when the preform (3) is being transferred between the opened injection molding tool (4) and the transfer means (7), the preform (3) is held by the outside of its neck continuation (18) by the tool part (19) of the injection molding tool (4) and is removed from the cavity (5), wherein the carrying frame (9) is guided by a guide arrangement formed by transport rails (8), in a straight transport movement between the injection molding tool (4) and the blow mold (6), the transport rails (8) defining a horizontally oriented transport plane (41), wherein when the preform is being transferred between the opened injection molding tool (4) and the transfer means (7), the direction of movement of the preform (3) is vertical and perpendicular to the transport plane (41), and the preform (3) is placed onto the at least one holding element (10) by the inside of its neck continuation (18) and the at least one holding element (10) thus lies in contact with an internal face (20) of the neck continuation (18), and wherein the at least one holding element (10) has at least one gap in the region of its center forming an orifice (69) for supplying blowing air (68) as well as a stretching tool into an interior of the preform (3), and the neck continuation (18) is held by the at least one holding element (10) during the blowing operation to form the hollow body (2).

2. Installation (1) according to claim 1, wherein the holding element (10) has a holder element (32, 61) on its external face directed towards the neck continuation (18), which is displaceable between a release position and a clamping position.

3. Installation (1) according to claim 1, wherein the holding element (10) has a holder groove (66) in its circumferential region with a circumferentially extending seal element (65) accommodated therein, and the holder groove (66) establishes a flow communication via at least one passage (67) with an axially oriented orifice (69) disposed in the holding element (10).

4. Installation (1) according to claim 1, wherein the holding element (10) is provided with a coolant passage which establishes a flow connection to a supply system via supply and discharge lines.

5. Installation (1) according to claim 1, wherein the holding element (10) is mounted on the carrying frame (9) so as to be displaceable relative thereto transversely to the transport direction of the carrying frame (9) between the injection molding tool (4) and the blow mold (6).

6. Installation (1) according to claim 1, wherein several holding elements (10) are disposed on a first base plate (13) one after the other in the transport direction of the carrying frame (9) between the injection molding tool (4) and the blow mold (6) in a first holding element group (11) and several holding elements (10) are disposed in at least one other holding element group (12) adjacent to the first holding element group (11) on another base plate (14), and the base plates (13, 14) are mounted on the carrying frame (9) so as to be displaceable relative thereto in the direction extending transversely to the transport direction of the carrying frame (9).

7. Installation (1) according to claim 1, wherein the tool part (19) is disposed between mold halves (23, 24) of the injection molding tool (4) and the tool part (19) constitutes the shaping part of the external face of the neck continuation (18) when the injection molding tool (4) is closed, and the tool part (19) is mounted so as to be guided in displacement in the direction perpendicular to a dividing plane between the mold halves (23, 24), and the tool part (19) comprises several tool part segments (25) which are displaceable towards one another in the direction parallel with the dividing plane of the mold halve (23, 24).

8. Installation (1) according to claim 1, wherein the blow mold (6) comprises several blow mold parts (37 to 39) disposed adjacent to one another as viewed in the transport direction, and the blow mold parts (37 to 39) are guided relative to one another in displacement in a vertically oriented dividing plane (42) as viewed relative to the transport direction of the transfer means (7).

9. Installation (1) according to claim 1, wherein after the blowing operation and when the blow mold (6) is opened, the produced hollow body (2) together with the holding element (10) is displaced relative to the carrying frame (9) in the direction extending transversely to the transport direction.

10. Method of producing hollow bodies (2) by injection molding and subsequent blow molding with an installation (1) in which a preform (3) with a neck continuation (18) and a hollow body part (22) adjoining the neck continuation (18) is injected in at least one cavity (5) in an injection molding tool (4) with a tool part (19), after which the injection molding tool (4) is opened and the preform (3) is removed from it, wherein the preform 2 is held by the outside face of its neck continuation (18) by the tool part (19) when the injection molding tool (4) is opened and removed from the cavity (5), and the preform (2) is transported by a transfer means (7) to a blow mold (6), the transfer means (7) comprising a carrying frame (9) on which at least one holding element (10) for the at least one preform (3) is disposed, wherein the carrying frame (9) is guided by a guide arrangement, which is formed by transport rails (8), in a straight transport movement between the injection molding tool (4) and the blow mold (6), the transport rails (8) defining a horizontally oriented transport plane (41), wherein when the preform (3) is being transferred between the opened injection molding tool (4) and the transfer means (7), the direction of movement of the preform (3) is vertical and perpendicular to the transport plane (41) and the preform (3) is placed onto the at least one holding element (10) disposed on the carrying frame (9) of the transfer means (7) by the inside of its neck continuation (18) and the at least one holding element (10) is placed in contact with an internal face (20) of the neck continuation (18), and wherein the at least one holding element (10) is formed with at least one gap in the region of its center which forms an orifice (69) through which blowing air (68) as well as a stretching tool is supplied into an interior of the preform (3), and the neck continuation (18) is held by the at least one holding element (10) during the blowing operation to form the hollow body (2), and the hollow body (2) is formed in the blow mold (6) from the preform (3).

11. Method according to claim 10, wherein a holder element is disposed on the holding element (10) on its external face directed towards the neck continuation (18) and the holder element is displaceable between a release position and a clamping position.

12. Method according to claim 10, wherein a coolant passage is provided in the holding element (10) and a coolant circulates through the coolant passage fed to and discharged from the coolant passage from a supply system via supply and discharge lines.

13. Method according to claim 10, wherein the holding element (10) is mounted on the carrying frame (9) so as to be displaceable relative thereto in the direction extending transversely to the transport direction of the carrying frame (9) between the injection molding tool (4) and the blow mold (6).

14. Method according to claim 10, wherein the tool part (19) is disposed between mold halves (23, 24) of the injection molding tool (4), and when the injection molding tool (4) is closed, the tool part (19) constitutes the shaping part of the external face of the neck continuation (18), and the tool part (19) is mounted so as to be guided in displacement in the direction perpendicular to a dividing plane between the mold halves (23, 24), and the tool part (19) is made up of several tool part segments (25) which are guided in displacement towards one another in the direction parallel with the dividing plane of the mold halves (23, 24).

15. Method according to claim 10, wherein the blow mold (6) is made up of several blow mold parts (37 to 39) disposed adjacent to one another as viewed in the transport direction, and the blow mold parts (37 to 39) are guided in displacement relative to one another in a vertically oriented dividing plane (42) as viewed in the transport direction of the transfer means (7).

16. Method according to claim 10, wherein after the blowing operation and when the blow mold (6) is opened, the produced hollow body (2) together with the holding element (10) is displaced relative to the carrying frame (9) in the direction extending transversely to the transport direction.

17. Method according to claim 10, wherein actual features of the produced hollow body (2) are detected in an inspection station adjoining the blow mold (6) and compared with desired features setting quality features.

\* \* \* \* \*